May 4, 1948.  A. D. EVANS  2,440,819
TUMBLING MILL
Filed March 9, 1944   10 Sheets-Sheet 1
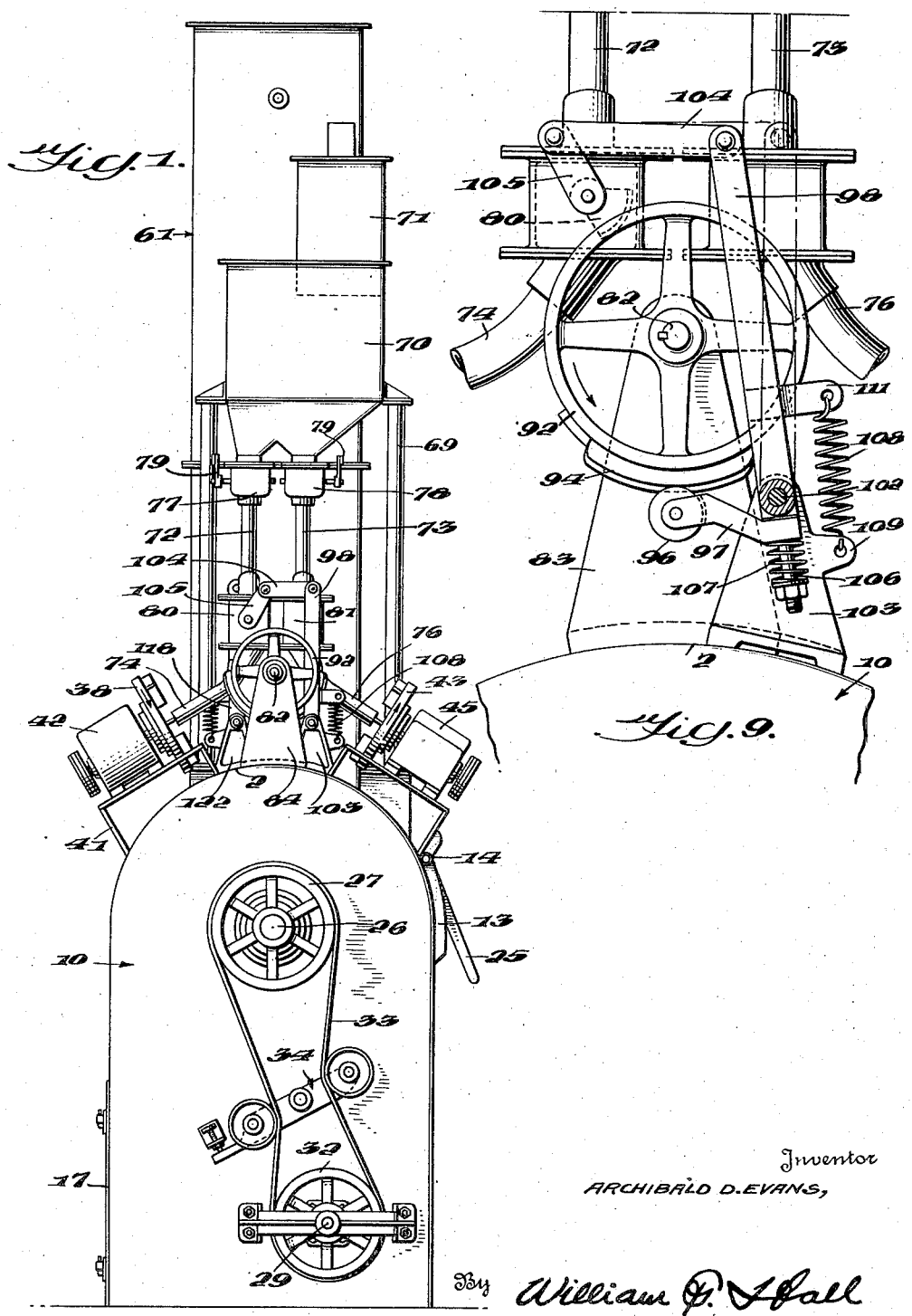
Inventor
ARCHIBALD D. EVANS,
By William G. Hall
Attorney

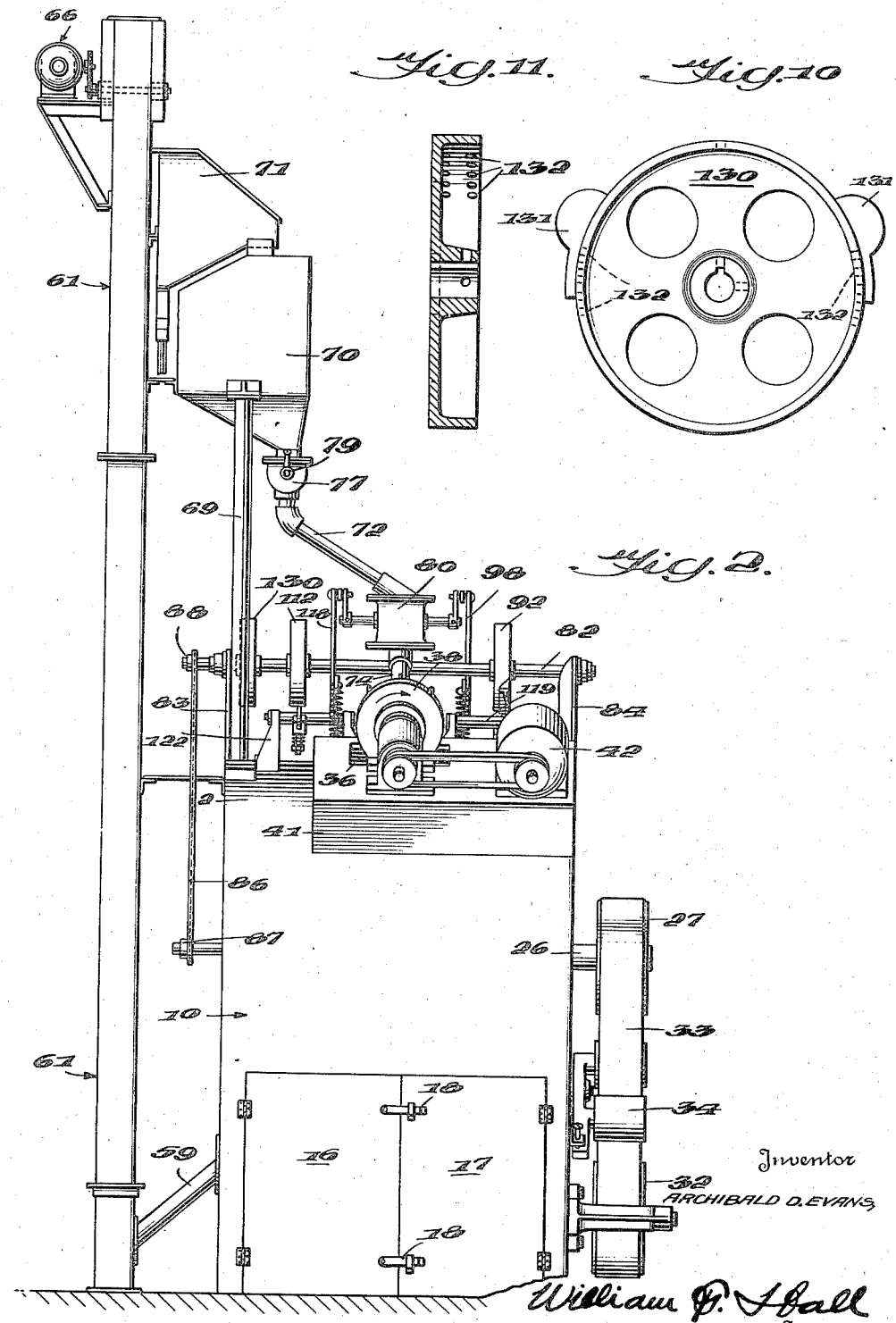

May 4, 1948.  A. D. EVANS  2,440,819
TUMBLING MILL
Filed March 9, 1944   10 Sheets-Sheet 3
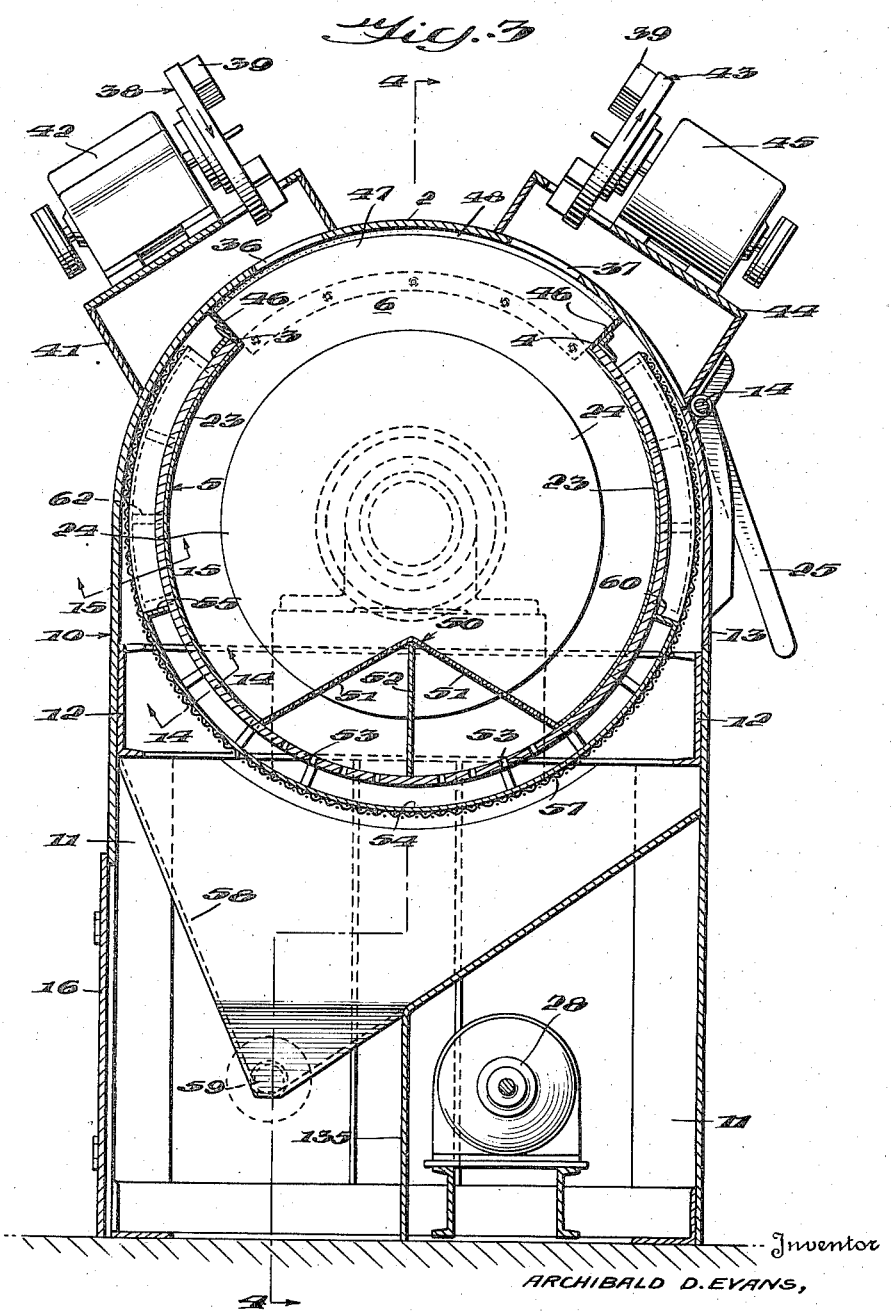
Inventor
ARCHIBALD D. EVANS,
By William D. Hall
Attorney

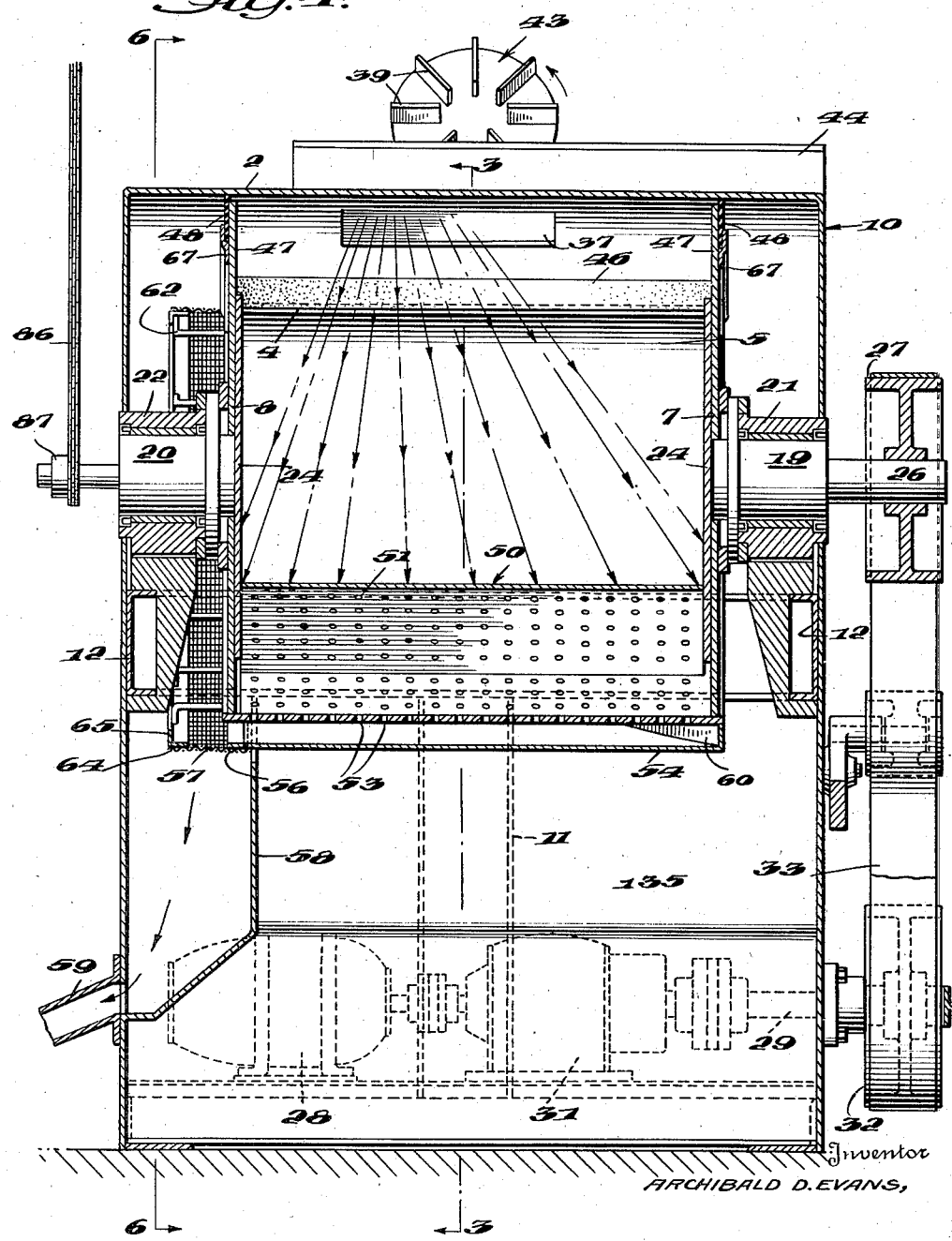

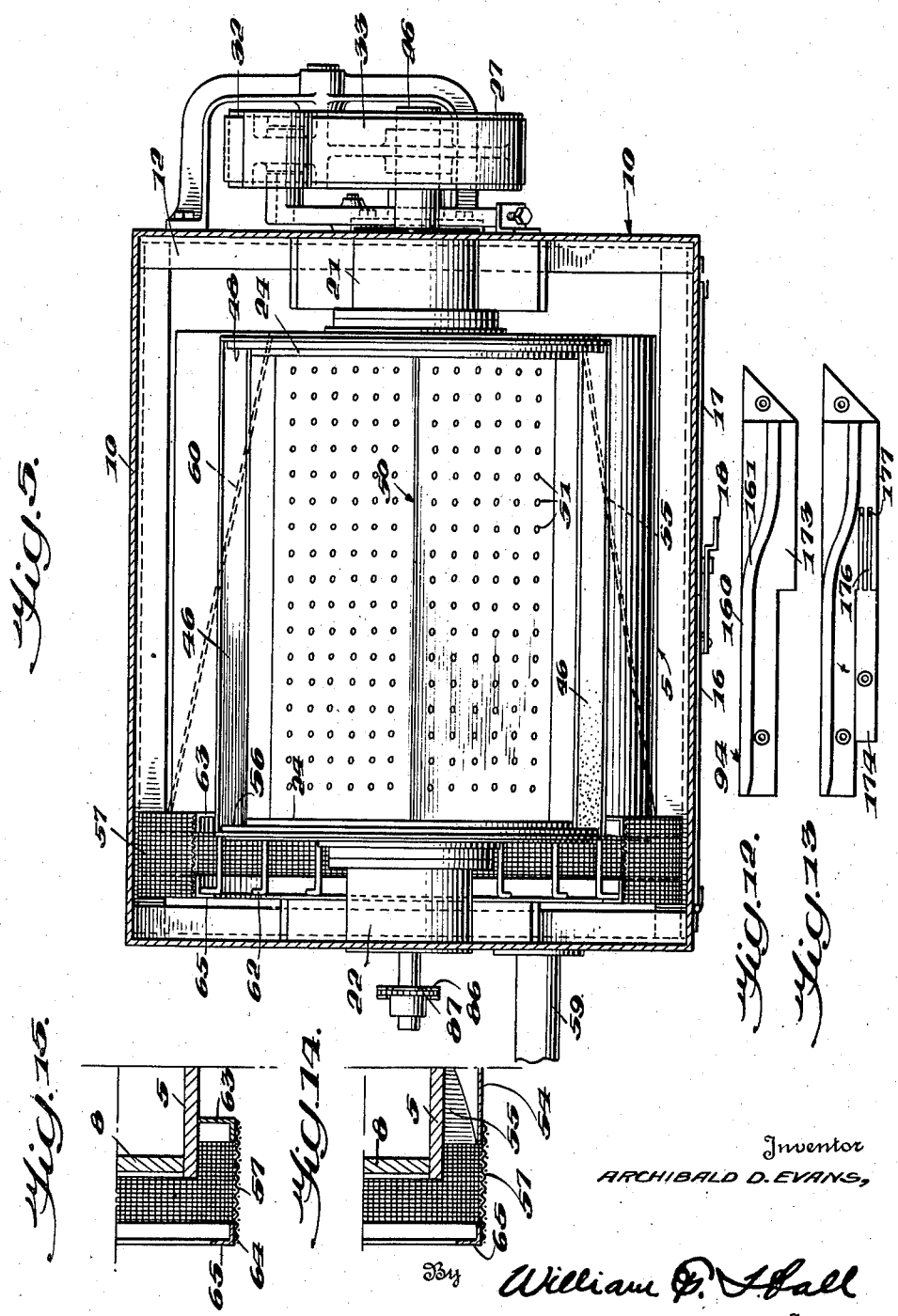

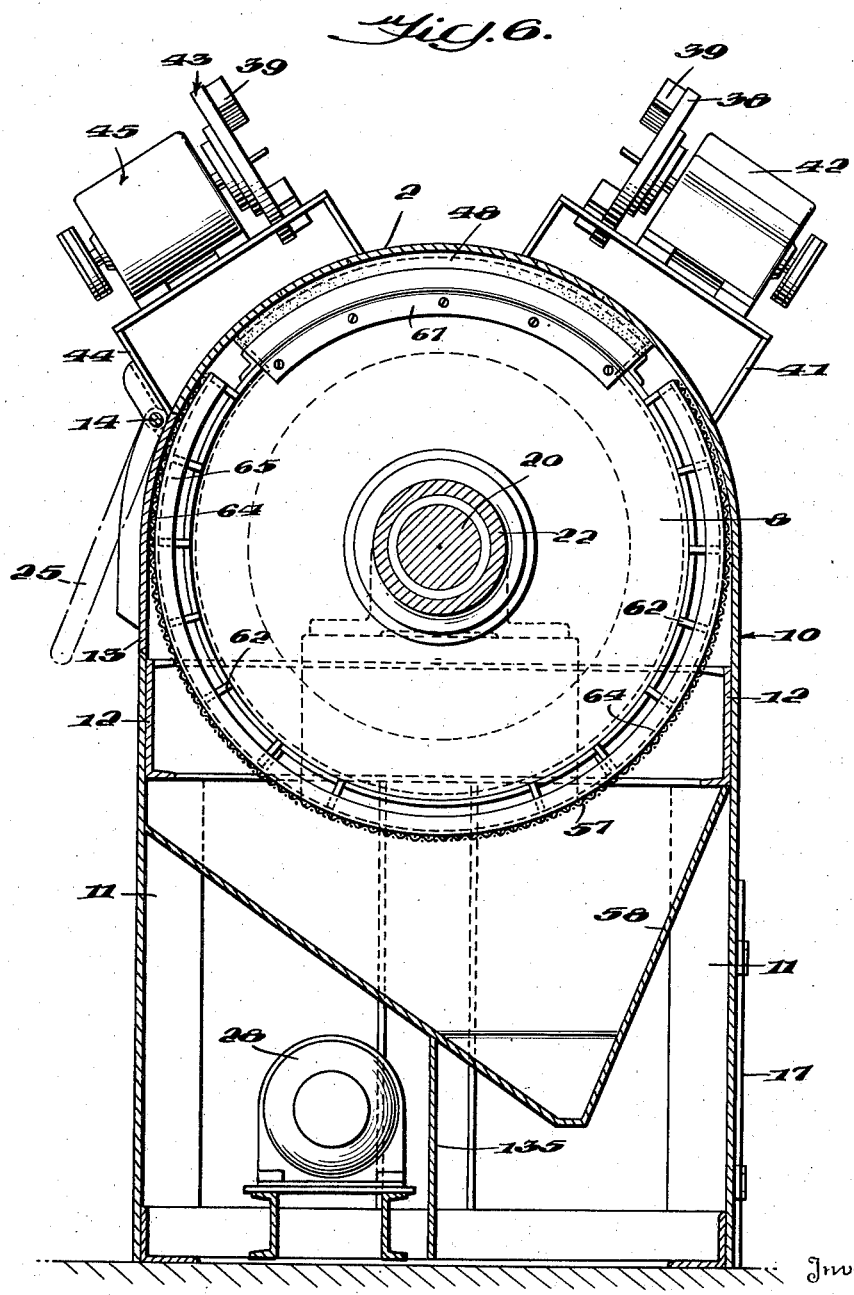

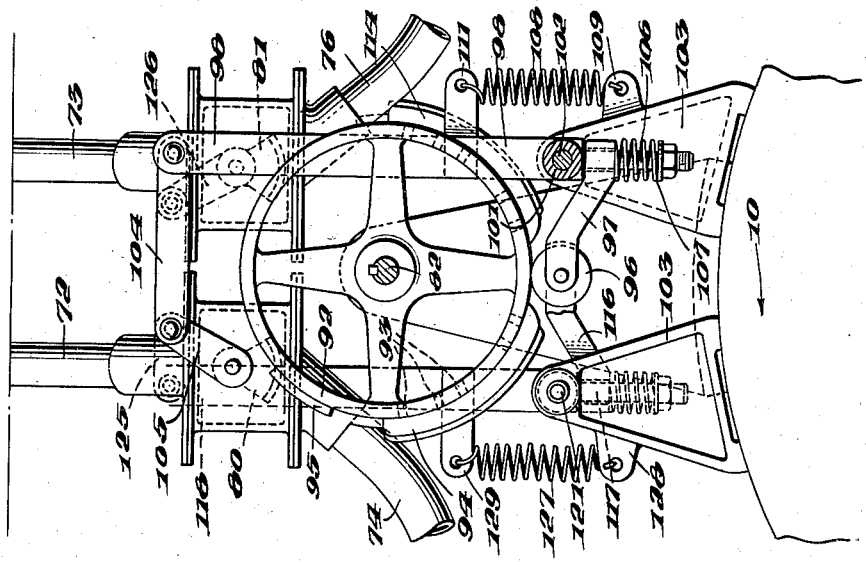
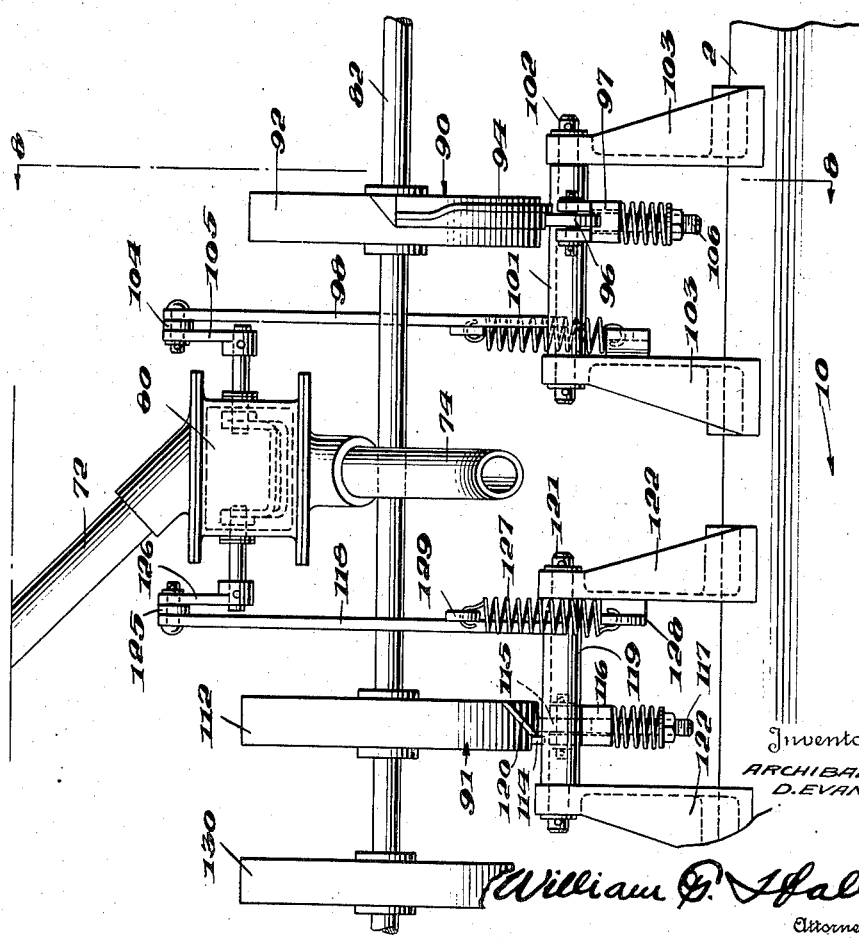

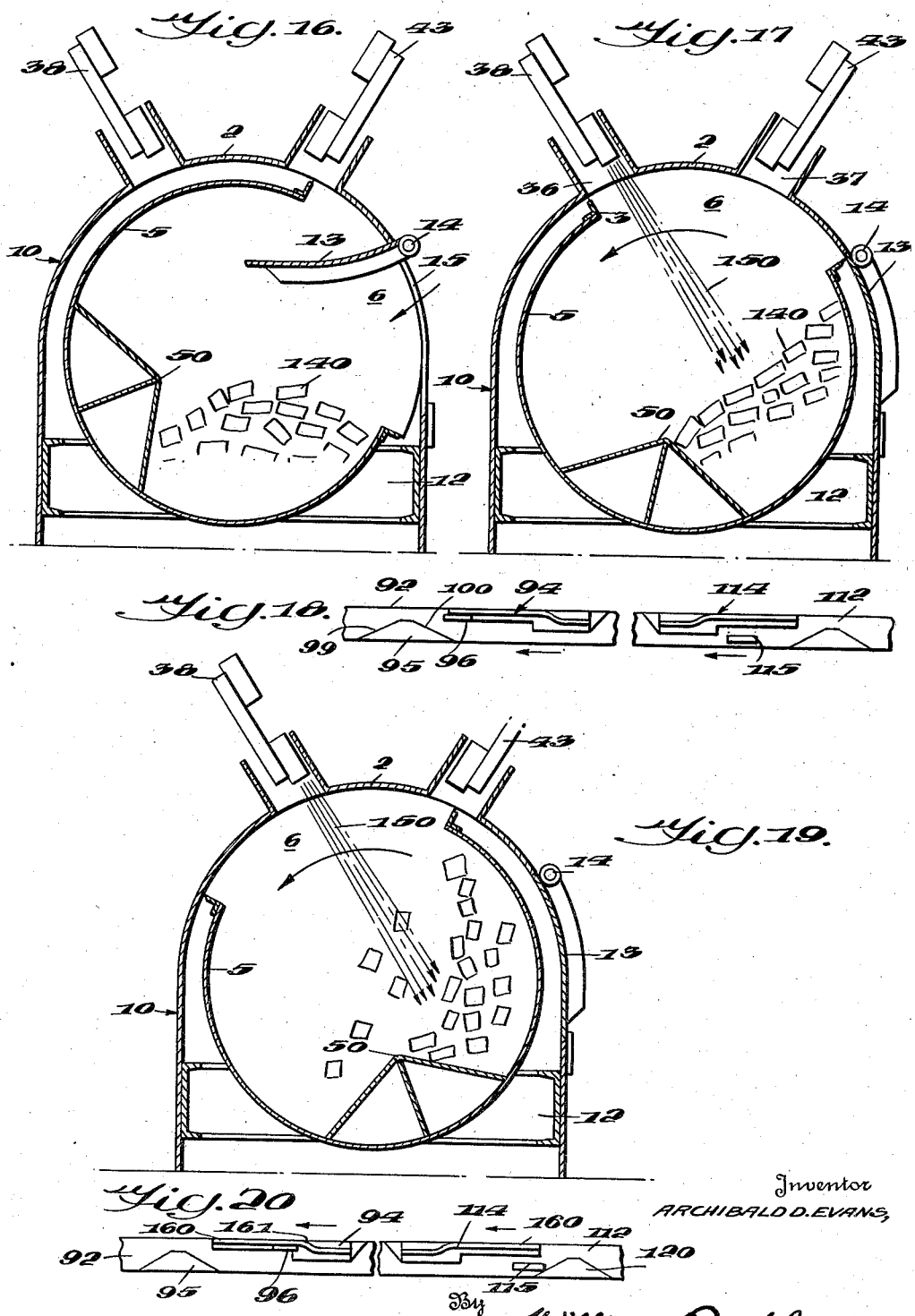

May 4, 1948.  A. D. EVANS  2,440,819
TUMBLING MILL
Filed March 9, 1944  10 Sheets-Sheet 9
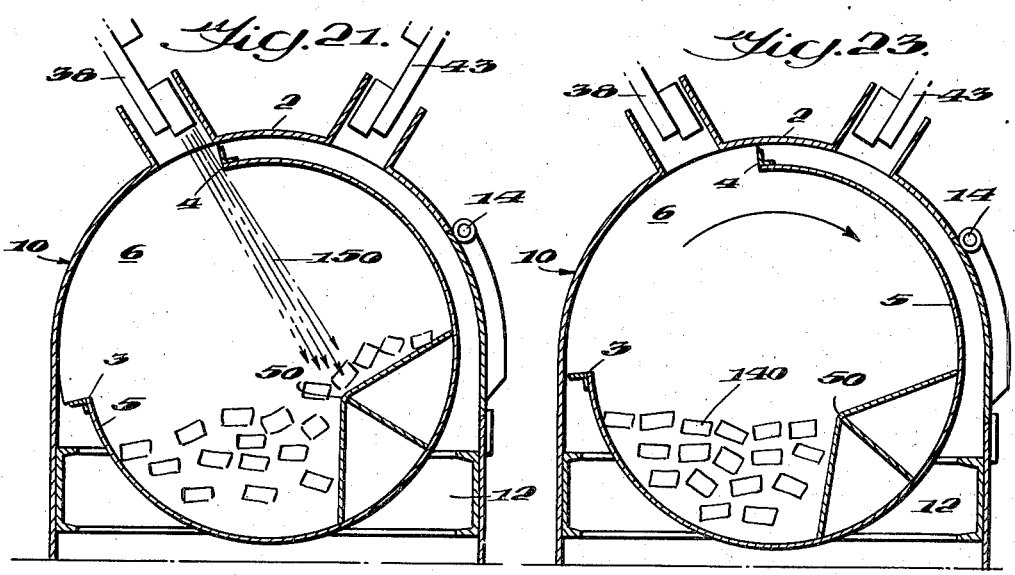
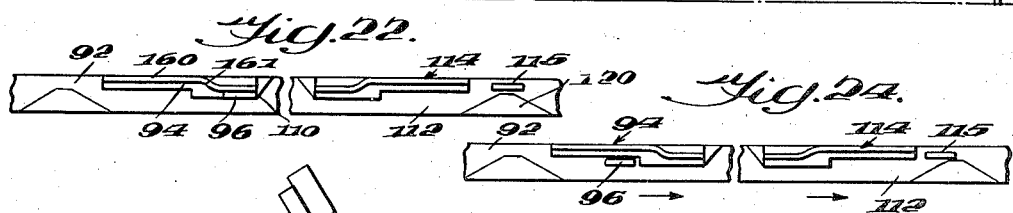
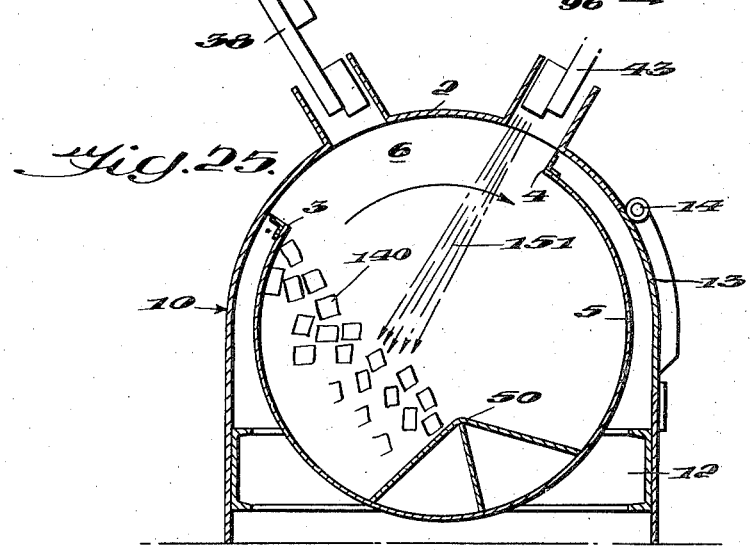
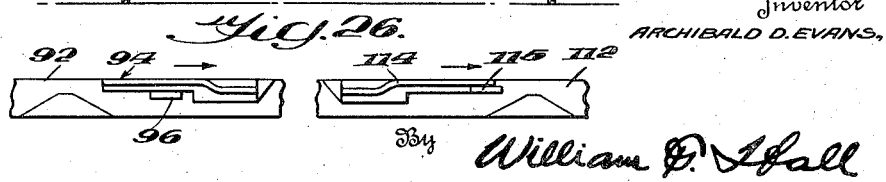
Inventor
ARCHIBALD D. EVANS,
By William D. Hall
Attorney May 4, 1948. A. D. EVANS 2,440,819
TUMBLING MILL
Filed March 9, 1944 10 Sheets-Sheet 10
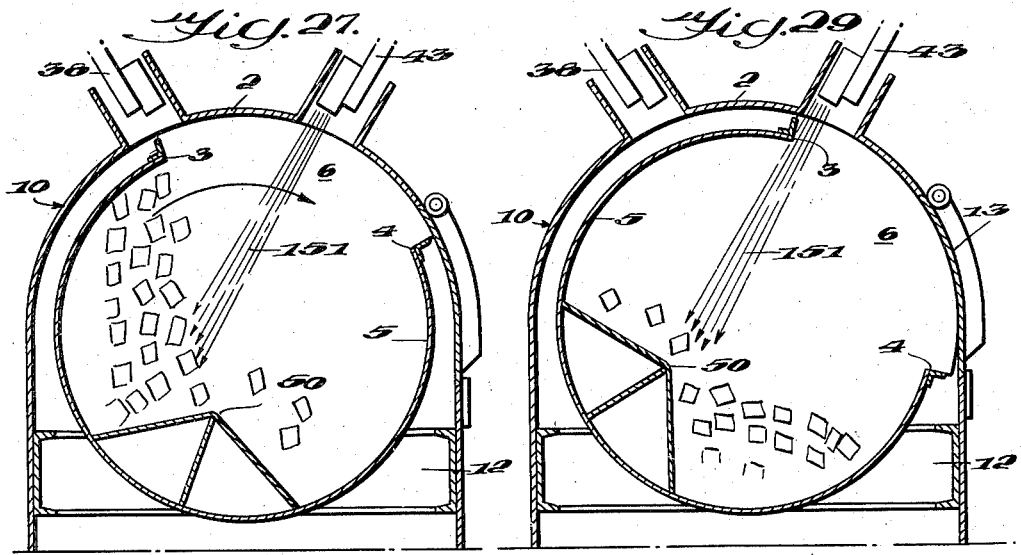
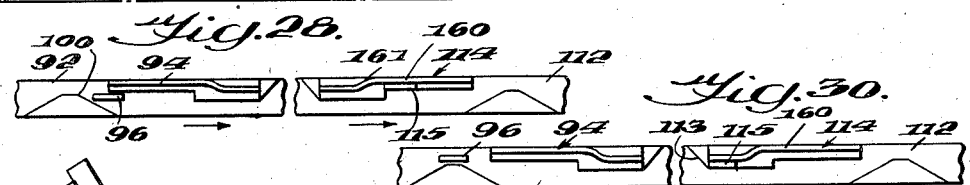
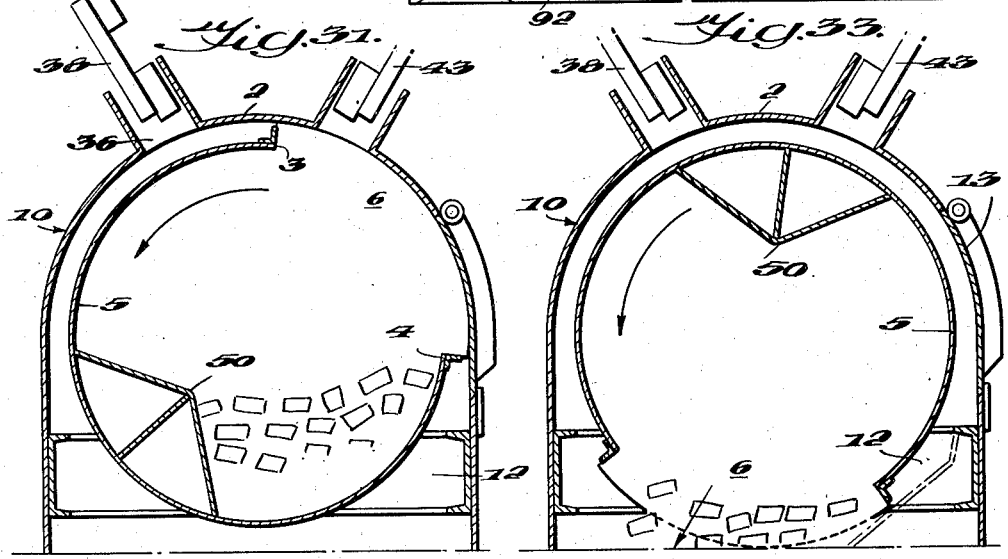
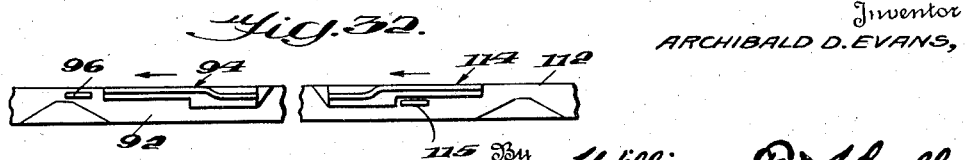
Inventor
ARCHIBALD D. EVANS,
By William P. Hall
Attorney Patented May 4, 1948

2,440,819

UNITED STATES PATENT OFFICE 2,440,819

TUMBLING MILL

Archibald D. Evans, Hagerstown, Md., assignor to Pangborn Corporation, Hagerstown, Md., a corporation of Maryland Application March 9, 1944, Serial No. 525,701

34 Claims. (Cl. 51—9)

The present invention relates to tumbling mills and more specifically pertains to such apparatus wherein articles are subjected to the action of a blast stream such as a forcible stream of abrasive particles.

One type of tumbling mill in general use prior to the present invention includes an endless conveyor usually formed of a plurality of slats so connected as to form a flexible endless band or apron for supporting the articles to be blasted. The endless conveyor in such a tumbling mill is arranged in a generally trough-like manner and is so moved as to cause the articles being treated to tumble towards the bottom of the trough. The articles supported on such an endless conveyor have been subjected to a continuous blast stream wherein the abrasive particles impinge upon the exposed surface of the compact mass of articles or castings. The endless conveyor is difficult to manufacture by reason of the many pivoted connections necessary to provide the flexible band, and the endless conveyors have a relatively short useful life by reason of the wear taking place at the various hinged connections. This wear is pronounced since the endless conveyor operates in the presence of the abrasive.

It is accordingly an object of the present invention to provide a tumbling mill wherein the disadvantages attendant the use of an endless conveyor are completely avoided and to provide apparatus for handling a group of articles wherein the moving parts of the tumbling mill are reduced to a minimum and the apparatus is provided with bearings located remotely of the abrasive employed in the blasting operation.

A further object of the invention resides in providing a tumbling mill wherein the time required to treat a load or group of articles, such as the time required to properly blast clean a batch of castings, is materially reduced in comparison to the time required to properly blast clean a comparable quantity of castings in known types of tumbling mills.

It is another object of the invention to further improve the efficiency of a tumbling mill by providing apparatus wherein the quantity of abrasive required to treat a load of articles, such as the quantity of abrasive required to properly blast clean a group of castings, is materially curtailed in comparison to the quantity of abrasive required to properly blast clean a similar quantity of castings in the prior types of tumbling mills.

Another object of the invention pertains to the provision of a tumbling mill including a drum which is adapted to oscillate through a limited arc and a plurality of abrasive projecting devices for individually directing a blast stream into the drum through an opening in the periphery thereof when the peripheral opening is in a position to admit a blast stream.

A further object of the invention resides in providing means for controlling the operative condition of each of a plurality of abrasive projecting devices in timed relation with the movement of the drum of the tumbling mill within which the articles to be treated are supported and moved.

Another object of the invention resides in providing a tumbling mill wherein a blast stream is established and the articles to be subjected to the blast stream are moved to a position so as to fall freely or cascade in a separated condition or spaced relation with respect to each other through the blast stream whereby greater surface areas of the individual articles are exposed to the blast stream.

Another and more detailed object of the invention pertains to the provision of a projection extending inwardly from the wall of a drum forming a part of the tumbling mill so as to positively move substantially all of the articles to be treated circumferentially with the drum and thereby elevate the articles to a position for cascading through the blast stream.

Another object of the invention resides in providing means for sealing the opening or slot in the periphery of an oscillating drum, forming a part of the tumbling mill with respect to a stationary housing so that abrasive particles projected in the drum and dust within the drum cannot escape through the opening or slot during normal oscillation of the drum.

Another object of the invention pertains to means for disposing of the abrasive from within a rigid drum forming a part of the tumbling mill.

A further object of the invention resides in providing a tumbling mill which may be loaded at one side and unloaded at the other side thereby facilitating the handling of articles to be blasted and providing apparatus permitting movement of the articles in one general direction in a manufacturing process and reducing the length of the inactive period of the apparatus and curtailing the time lost in unloading and reloading a tumbling mill.

Other objects and features of the invention will be more apparent as the present description proceeds and upon consideration of the accompanying drawings and the following detailed description wherein an exemplary embodiment of the invention is disclosed.

In the drawings:

Fig. 1 is an end elevational view of a tumbling mill illustrating the general organization of apparatus embodying the invention.

Fig. 2 is a side elevational view of the tumbling mill illustrated in Fig. 1 showing the unloading side of the apparatus.

Fig. 3 is a vertical sectional view taken on the line 3—3 of Fig. 4 through the central portion of the drum and illustrating the abrasive projecting devices in elevation.

Fig. 4 is a longitudinal sectional view of the drum and the housing therefor taken on the line 4—4 of Fig. 3.

Fig. 5 is a horizontal sectional view of the drum and housing.

Fig. 6 is a sectional view taken on the line 6—6 of Fig. 4.

Fig. 7 is an enlarged side elevational view of the cam mechanism for rendering the abrasive projecting devices operative and for interrupting the blast streams in timed relation to the movement of the drum.

Fig. 8 is an elevational view partly in section taken on the line 8—8 of Fig. 7.

Fig. 9 is a view similar to Fig. 8 illustrating the manner in which one of the abrasive control valves is actuated.

Fig. 10 is a side elevational view of the cam assembly for controlling the oscillation of the drum.

Fig. 11 is a sectional view of the cam wheel shown in Fig. 10.

Fig. 12 is a diagrammatic view illustrating the development of one of the cam elements for controlling one of the abrasive projecting devices.

Fig. 13 is a similar view illustrating a modified cam element.

Fig. 14 is a fragmentary sectional view taken on the line 14—14 of Fig. 3 illustrating the end portion of the abrasive disposal trough and the associate screen.

Fig. 15 is a fragmentary sectional view taken on the line 15—15 of Fig. 3 illustrating the manner in which the screen is associated with the discharge end of the drum.

Fig. 16 is a simplified sectional view illustrating the loading position of the drum.

Fig. 17 is a similar sectional view illustrating the manner in which one blast stream may be established in relation to the position of the drum.

Fig. 18 is a diagrammatic developed view of the cam mechanism showing the position of the parts thereof for providing the operating characteristics illustrated in Fig. 17.

Fig. 19 is a simplified sectional view illustrating the manner in which the articles fall or cascade through the blast stream.

Fig. 20 is a diagrammatic developed view of the cam parts illustrating the position thereof when the drum is in the position depicted in Fig. 19.

Fig. 21 is a simplified sectional view through the drum showing the operating conditions at the point of reversal of the drum in an exemplary operating cycle.

Fig. 22 is a developed view of the cam mechanism showing the relative position of the cam parts when the drum is in the position shown in Fig. 21.

Fig. 23 is a simplified sectional view of the drum illustrating the position of the articles during initial reverse rotation of the drum.

Fig. 24 is a diagrammatic developed view of the cam mechanism illustrating the positions of the parts to provide the exemplary operating condition depicted in Fig. 23.

Fig. 25 is a simplified sectional view illustrating the position of the articles during continued reversed rotation of the drum and an exemplary operating stage when another blast stream is established.

Fig. 26 shows the position of the cam parts to provide the operating characteristics shown in Fig. 25.

Fig. 27 is a simplified sectional view illustrating the manner in which the articles cascade or fall in a more or less separated condition through the second blast stream.

Fig. 28 illustrates the position of the cam mechanism to provide the operating characteristics shown in Fig. 27.

Fig. 29 is a simplified sectional view of the drum showing the position thereof at the time when the drum stops rotating in a clockwise direction in an exemplary operating cycle.

Fig. 30 illustrates the position of the cam parts when the second blast stream is maintained at the point of reversal of the drum as shown in Fig. 29.

Fig. 31 illustrates an exemplary set of operating conditions at one point in the oscillating cycle and the manner in which the articles are positively moved circumferentially with the drum.

Fig. 32 shows the position of the cam parts when the operating conditions shown in Fig. 31 are desired.

Fig. 33 is a simplified sectional view illustrating the drum in an unloading position.

A tumbling mill embodying the invention includes a drum or barrel 5 adapted to receive and shift a group of articles to be subjected to a blast stream, such as a forcible stream of abrasive particles moving at blasting or abrading velocities. The drum is provided with an opening or slot 6 in the periphery thereof of limited circumferential extent through which the articles to be treated are introduced into the drum. The invention provides for the oscillation of the drum through a limited arc with the opening or slot 6 remaining in a generally upper position to retain the articles within the drum during the blasting operation. A tumbling mill exhibiting the invention includes a plurality of abrasive projecting devices circumferentially spaced with respect to each other and mounted in positions so as to direct a blast stream downwardly into the drum when the opening or slot 6 is positioned to admit the blast stream projected by each abrasive projecting device. The drum forming a part of the tumbling mill thus avoids the disadvantages of an endless conveyor in that the drum may be rigid and thus includes a minimum of movable parts that are susceptible of wear and abrasion as a result of the presence of the abrasive. The invention includes means for controlling the projection of the blast streams into the drum in timed relation with respect to the movement of the drum and an exemplary sequence of operation has been shown in Figs. 17 to 32 and in this operating cycle the abrasive projecting devices are so controlled as to intermittently blast the articles within the drum. It will be appreciated that such a sequence of operating conditions is merely illustrative of one set of operating characteristics and the cycle of operation shown in Figs. 17 to 32 is accordingly to be regarded merely as illustrative and not defining the limits of the invention.

A tumbling mill exhibiting the invention is shown in the drawings and there is illustrated generally at 10 a stationary housing for encasing the drum 5 which forms an essential part of the tumbling mill. The housing may be formed of sheet metal and may be reinforced in any suitable manner. The housing is preferably arranged over an appropriate frame including supporting standards 11 and cross beams 12 to provide a rigid framework. The housing extends downwardly to the floor or any suitable supporting base, and thus provides a closed casing. The upper portion of the housing is arcuate shaped as shown at 2, and this portion of the housing is preferably circular in cross-section and substantially concentric with the path described by the peripheral portion of the drum 5 adjacent the slot 6 and the purpose thereof will be apparent as the present description proceeds. The housing 10 is provided with a door 13, which may be pivotally mounted on the housing by any suitable means, such as by a hinge arrangement shown at 14. The door 13 is provided for permitting the introduction of articles into the tumbling mill. The opening for the door 13 thus defines a loading station and the door is adapted to swing inwardly through the opening or slot 6 in the periphery of the drum 5 so that articles to be treated within the tumbling mill may be introduced through an opening 15 as illustrated in Fig. 16. A handle 25 may be provided for actuating the door.

The housing is also provided with closure means such as double doors indicated at 16 and 17 in Fig. 2. These doors may be mounted in any suitable manner, such as hinged at the side edges thereof to the housing 10 so that the lower part of the housing may be opened for the entrance of a tote box or other receptacle for receiving the articles dumped from the drum 5 after the blasting and tumbling operation has been completed. The doors 16 and 17 are preferably designed to provide a tight closure to thereby prevent the escape of dust and the like during operation of the tumbling mill. These doors may be secured in a closed position by any conventional means such as a latch mechanism shown at 18 in Fig. 2.

A primary feature of the invention pertains to the drum or barrel 5 in which the articles to be treated are introduced and subjected to a blast stream such as abrasive particles forcefully projected by any type of well known means. The drum or barrel 5 may be mounted for rotation in any suitable manner with the supporting bearing located remotely of the abrasive employed in the blasting operation. Thus the end walls 7 and 8 of the drum may be provided with trunnion shafts 19 and 20 which are rotatably mounted in bearings 21 and 22 supported by the frame within the housing 10. The bearings 21 and 22 may be mounted on the beams 12. The drum 5 is preferably cylindrical shaped and rigid. The peripheral portion of the drum terminates at 3 and 4 to provide the opening or slot 6 of limited circumferential extent, and in exemplary apparatus this peripheral opening 6 extends throughout the circumference of the drum for approximately ninety degrees. The drum may be provided with a replaceable liner 23 suitably maintained along the inner wall of the drum. The liner shells 23 terminate adjacent the lips 3 and 4 and the opening or slot 6 in the periphery of the drum is thus entirely unobstructed. The end walls 7 and 8 of the drum may be provided with detachable wear plates or discs 24 suitably secured to the end walls of the drum in any conventional manner so that these wear plates may be readily replaced.

In carrying out the invention the drum 5 is oscillated through a limited arc so that the opening 6 remains in a generally upper position during normal oscillation to retain articles within the drum. In other words, the opening 6 remains in an upward position to prevent the escape of articles outwardly through the opening 6 until the drum is rotated to an unloading station as hereinafter described. In one operating cycle the drum is so moved that the center of the opening 6 moves through an arc of one hundred and twenty degrees. Any suitable mechanism may be provided for driving the drum and in the apparatus illustrated, the trunnion 19 is provided with a short shaft 26 which projects beyond the end wall of the housing 10. A pulley 27 is secured to the shaft 26. An electric motor 28 of a reversible type may be mounted on transverse beams within the housing 10 below the drum as shown in Fig. 4. The motor 28 is arranged to drive a shaft 29 through any conventional type of speed reducing mechanism 31. The shaft 29 driven by the motor through the speed reducing mechanism may be provided with a pulley 32 aligned with the pulley 27. A belt 33 is trained around the pulleys 27 and 32. A belt tightening arrangement illustrated generally at 34 may be provided for causing the belt 33 to properly grip the periphery of the pulleys 27 and 32. While the driving arrangement shown and described has been found to function satisfactorily, it is to be understood that any type of driving mechanism may be employed for imparting rotary and oscillating motion to the drum 5.

The abrasive projecting devices are mounted so that each may direct an abrasive blast stream into the drum 5 through the opening or slot 6. Any conventional type of abrasive blasting device may be employed in association with the drum 5, and in the embodiment shown in the drawings, two abrasive throwing wheels are employed for projecting the abrasive into the drum. The arcuate portion 2 of the housing is accordingly provided with two openings as illustrated at 36 and 37 in Fig. 3. It will be observed that the opening 37 is circumferentially spaced from the opening 36. These openings 36 and 37 are provided for the purpose of permitting the abrasive to pass through the housing and into the drum. One of the abrasive projecting devices is represented at 38 in the form of a wheel of the type where abrasive is supplied to the inner ends of the propelling blades 39 at one point or zone in the rotation thereof so as to direct an abrasive blast stream downwardly as the abrasive leaves the periphery of the wheel through the opening 36 and into the drum 5 when the opening 6 is positioned to admit abrasive into the drum. The wheel 38 may be mounted on the housing in any suitable manner such as by means of a platform 41 so that the periphery of the wheel is above the inner surface of the arcuate portion 2 of the housing. This wheel is adapted to be driven in one direction in any suitable manner, such as by a motor 42 shown in Fig. 2.

The other abrasive projecting device is also represented as a wheel 43, and this wheel is adapted to be driven by an electric motor 45 in a direction which is opposite to the rotation of the wheel 38, as indicated by the arrows in Fig. 3. The wheel 43 is likewise provided with propeller blades 39 which hurl the abrasive downwardly through the opening 37 into the drum 5 when the slot or opening 6 is positioned to permit abrasive to enter the drum. The wheel 43 may be mounted on a platform 44. The angle included between the planes of rotation of the wheels is preferably less than the circumferential extent of the opening or slot 6 in the drum, and this included angle may amount to approximately sixty-six degrees, but it will be appreciated that the circumferential spacing of the wheels may be varied without departing from the scope of the invention.

The wheels 38 and 43 each project abrasive particles in a substantially rectangular pattern, and it is to be noted that the abrasive blast stream provided by each wheel is arranged with its major dimension approximately parallel to the axis of the drum 5. In the operation of the tumbling mill, and if an abrasive blast stream is projected simultaneously by both wheels, these blast streams intersect at a point slightly above the axis of the drum 5. One of the wheels rotating in one direction provides a head stream for the abrasive at one end of the barrel, and the other wheel rotating in the other direction provides a head stream of abrasive at the other end of the barrel.

The invention includes means for sealing the interior of the drum 5 with respect to the housing 10 so as to prevent the escape of abrasive and dust from the drum through the opening 6. It is for this purpose that gasket means is provided around the perimeter of the opening or slot 6. The gasket means may be attached to the drum and wipe along the inner surface of the arcuate portion 2 of the housing. Thus the drum may be provided with yieldable or resilient strips 46 extending axially along the lips 3 and 4 of the drum adjacent the circumferential ends of the opening 6. These strips 46 may be formed of any suitable material such as rubber or synthetic materials attached to the drum and extending radially outward so as to wipe along the inner surface of the arcuate portion 2 of the housing during oscillation of the drum. The end walls 7 and 8 of the drum are shown as extending radially outward beyond the peripheral wall at that portion of the drum defined by the opening 6 as shown at 47 in Figs. 3 and 4. The outer ends of these segments 47 terminate short of the arcuate housing portion 2 so as to provide clearance between the drum assembly and the housing. The gasket arrangement includes yieldable or resilient strips 48 attached to the segments 47. For this purpose arcuate shaped clamps 67 may be bolted to the end walls of the drum as shown in Fig. 6. The gasket strips 48 may likewise be formed of rubber or synthetic materials and these strips 48 engage the inner surface of the curved portion 2 of the housing. Thus the interior of the drum 5 is sealed with respect to the housing during normal oscillation of the drum.

Another feature of the invention pertains to a projection extending inwardly from the wall of the drum 5 to such a position as to positively move all of the articles forming a normal load circumferentially with the drum. This projection is represented at 50 and extends throughout the length of the drum as shown in Figs. 4 and 5. The projection 50 may be of any contour in cross-section and the projection is preferably hollow for the purpose of disposing of the abrasive from within the drum, as hereinafter described. The projection 50 extends radially inward to a point for positively pushing all of the articles with the drum during rotation thereof and thereby lifting or elevating these articles so that they cascade or fall to the opposite side of the projection 50. In the embodiment illustrated in the drawing, the projection 50 is hollow and forms an inverted V-shaped lug extending radially inward from the inner wall of the drum 5 for a distance approximately equal to one-half the radius of the drum. The projection 50 may be formed of sheet metal attached to the drum in any convenient manner such as by welding. A load of articles to be treated within the drum are introduced through the opening 15 as shown in Fig. 16, and the articles are all arranged at one side of the projection 50. Thus when the drum is rotated in a counter-clockwise direction, as shown in Fig. 17, from the loading station the articles are all positively moved with the drum, since the projection 50 extends radially inward for a distance sufficient for positively shifting all of the articles circumferentially to a position where they cascade downwardly in a separated condition over the projection 50, as shown in Fig. 19. The projection 50 is preferably arranged with the inverted apex thereof substantially diametrically opposite the center of the opening or slot 6 so as to function in a similar reversed manner during clockwise rotation of the drum.

The tumbling mill includes means for disposing of the abrasive projected into the drum by the abrasive projecting devices or wheels prior to the unloading of the articles through the opening 6. The means for disposing of the abrasive pertains to sifting the abrasive particles through the periphery of the drum and conveying these abrasive particles axially of the drum to one end thereof for disposal into a discharge hopper without the use of a worm conveyor. For this purpose the projection 50 and the substantially flat side portions thereof may be provided with a plurality of openings 51. Thus the spent abrasive particles within the drum may sift through the openings 51 to a position within the hollow projection 50. A partition 52 may be provided within the hollow projection 50 for preventing the spent abrasive particles therein from moving circumferentially and escaping back into the interior of the drum through other openings 51 when the drum moves through a cycle of oscillation. The outer wall of the drum is also provided with a plurality of apertures 53 which are arranged in that portion of the drum covered by the projection 50. Thus the abrasive may escape through the apertures 53 to a position outside the drum 5.

The abrasive disposal arrangement includes a trough-like member 54 carried by the drum and positioned radially outwardly of the apertures 53 so as to receive the abrasive escaping through these holes. The trough 54 extends throughout the length of the drum and may be formed of sheet metal suitably attached to the drum, such as by welding. The trough is relatively narrow in circumferential extent adjacent one end of the drum and relatively wide in circumferential extent at the end 56 of the drum where the abrasive is to be discharged. The circumferential extent of the trough 54 is shown in Fig. 5 and it will be observed that the end walls 55 and 60 diverge from each other in proceeding towards the discharge end 56 of the drum. Thus the abrasive deposited in the trough 54 will be supported by one of the inclined end walls 55 or 60 when the drum and the trough moving therewith is rotated to position the trough somewhat laterally of the axis of the drum whereby the abrasive in the trough 54 will slide downwardly along one of the inclined end walls 55 or 60 to the end 56 of the drum.

The abrasive particles discharged from the end of the trough 54 pass onto a screen shown at 57 and the abrasive particles passing through the screen drop into a hopper 58 provided within the housing at one end thereof. The hopper 58 is formed with sloping side walls whereby the abrasive is delivered through an outlet conduit 59 into an elevator shown diagrammatically at 61 for returning the particles to a storage bin 70 for re-use by the abrasive projecting devices. The band or endless conveyor carrying the buckets or cups (not shown) of the elevator 61 may be driven by a motor 66. The screen 57 is mounted at the end 56 of the drum and extends circumferentially so as to embrace a major portion of the drum, as shown in Figs. 3 and 6. The screen may be supported by brackets 62 carried by the drum. The screen 57 is further supported by arcuate members 63 which reinforce the screen intermediate brackets 62 and close the inner axial end of the screen laterally of the trough 54, as shown in Fig. 15. A ring 64 may also be provided at the outer end of the screen 57 to support the screen between the bracket 62. The ring 64 is provided with an inturned flange 65 for preventing the escape of abrasive over the outer end of the screen 57.

The tumbling mill includes means for controlling the initiation and interruption of the blast stream projected by the abrasive projecting devices in timed relation with the oscillation of the drum. The invention thus includes means for initiating the blast stream of one of the abrasive throwing wheels when the opening or slot 6 is in a position to allow the blast stream to enter the drum and to interrupt this same blast stream before the periphery of the drum adjacent the opening or slot 6 moves into the path of the blast stream. In an exemplary embodiment of the invention the abrasive throwing wheels 38 and 43 are rotated continuously during the treatment of any one load of articles, and control means provides for interrupting the supply of abrasive furnished to each wheel to thereby control the operative period of the abrasive projecting devices.

Apparatus exhibiting such features of the invention may include the storage bin 70 mounted above the housing 10 on posts or standards 69 and adapted to store a quantity of abrasive. The storage bin 70 is also adapted to receive the spent abrasive particles returned by the elevator 61 through a conventional type of cleaning mechanism represented generally at 71. The abrasive stored in the hopper 70 is adapted to pass downwardly through suitable feed conduits to each of the wheels 38 and 43 in dependence upon the action of the control mechanism. The bin or hopper 70 may be provided with two discharge pipes 72 and 73. The pipe 72 delivers the abrasive into a feed spout 74 which supplies abrasive to the wheel 38 and the pipe 73 supplies abrasive into a feed spout 76 which guides abrasive to the wheel 43. A pair of manually controlled valves 77 and 78 may be provided for blocking the flow of abrasive from the hopper 70. Each of these valves is provided with an operating handle 79. The supply of abrasive to each of the wheels is automatically controlled by a valve associated with each of the feed pipes 72 and 73. These valves are shown at 80 and 81, respectively, in Fig. 8.

In order that the valves 80 and 81 may be controlled in timed relation with oscillation of the drum 5 and in accordance with the position of the opening or slot 6, a cam mechanism is provided which is actuated in timed relation with the movement of the drum 5. Thus a shaft 82 may be mounted for rotation in suitable bearings, and supported by brackets 83 and 84 arranged on top of the housing 10. The shaft 82 is driven in synchronism with the drum 5 in any suitable manner such as by a chain 86 trained around a sprocket 87 on an extension of the trunnion shaft 20 and a sprocket 88 secured to the shaft 82. This chain 86 drives the shaft 82 in timed relation with the oscillating movement of the drum 5.

A plurality of cam assemblies illustrated generally at 90 and 91 in Fig. 7 are provided to rotate with the shaft 82. The cam assembly 90 includes a cylindrical shaped wheel 92 keyed to the shaft 82, as shown in Fig. 8. This wheel 92 is provided with a smooth peripheral surface of cylindrical shape and is preferably provided with a plurality of holes 93 for mounting a cam element 94 on the wheel 92. The holes 93 are provided for the purpose of adjusting the cam element 94 circumferentially on the wheel 92. Thus the cam element 94 may be secured to the wheel 92 by bolts introduced through the holes 93. The cam element 94 provides a raised portion on the periphery of the wheel 92 and when a cam follower such as a roller 96 is engaged and rides on the elevated portion of the cam element 94 the valve 80 is moved to a position to admit abrasive particles to the wheel 38 through the feed spout 74. Thus the holes 93 permit circumferential adjustment of the cam element 94 and thereby permit variation of the instant when the abrasive projecting device represented by the wheel 38 becomes operative to direct a blast stream of abrasive into the drum through the opening 6.

The cam follower or roller 96 may be mounted in a forked end portion of an arm 97, as shown in Figs. 7 and 8. The arm 97 is mounted on a spindle 106 carried by a sleeve 101. A lever 98 is rigidly secured to the sleeve 101, and this sleeve is adapted to turn on a pin 102. The pin 102 may be supported by a pair of brackets 103 suitably attached to the top portion of the housing 10. When the wheel 92 rotates in a counterclockwise direction as shown in Fig. 9, and in the same direction as the drum 5, the cam element 94 will engage the roller 96 and move the cam follower outward from the periphery of the wheel 92. Such movement will swing the arm 97 in a counterclockwise direction about the pin 102. The arm 97 may also turn on the spindle 106 so that the roller 96 may swing laterally and properly follow the cam assembly as hereinafter described. Any means may be provided for preventing inadvertent swinging movement of the arm 97 on the spindle 106, and in the embodiment illustrated, a spring 107 is adapted to yieldably maintain the arm 97 in any rotated position about the axis of the spindle 106.

The lever 98 is rigidly secured to the sleeve 101 and extends upwardly to a point adjacent the automatic abrasive control valves. The upper end of the lever 98 is connected by a link 104 to an arm 105 which actuates the valve 80. Thus when the arm 97 is moved away from the wheel 92, the valve 80 is operated to admit abrasive to the feed spout 74 and the wheel 38. Any suitable means may be provided for returning the lever 98 to an inoperative position so as to close the valve 80 and interrupt the blast stream projected by the wheel 38 when the cam follower 96 reaches an end of the cam element 94. Thus a spring 108 may be tensioned between the arm 98 and a fixed portion of the tumbling mill. In the embodiment illustrated, the spring 108 is attached at one end to a lug 109 carried by one of the brackets 103. The other end of the spring 108 may be attached to the lever 98 by means of a bracket 111.

The control means also provides for the actuation of the valve 81 in a manner similar to the manipulation of the control valve 80. Thus the cam assembly 91 may also include a cam wheel 112 mounted on the shaft 82 so as to rotate therewith. This cam wheel 112 is also provided with a cam element 114 corresponding in shape and contour to the cam 94 but mounted in a reversed relation as will be apparent from Fig. 18. The cam element 114 is adapted to engage a cam follower or roller 115. The cam follower or roller 115 is mounted in the forked end of an arm 116 and this arm 116 may also swing about the axis of a spindle 117 which projects from a sleeve 119. The sleeve 119 is rotatably mounted on a pin 121. The pin 121 may be supported above the housing 10 by means of a pair of brackets 122. Thus when the cam element 114 engages the cam follower 115 the arm 116 turns the sleeve 119 about the axis of the pin 121. A lever 118 is rigidly secured to the sleeve 119 and extends upwardly to a point adjacent the abrasive control valves. The upper end of the lever 118 swings to the right from the position shown in Fig. 8 when the roller 115 rides on the cam element 114. The upper end of the lever 118 is connected by a link 125 to an operating arm 126 for the valve 81. Thus when the cam follower 115 is moved from the periphery of the wheel 112 by the cam element 114, the valve 81 is opened to admit abrasive to the feed spout 76 and to the wheel 43. The wheel 112 is likewise provided with a series of apertures so as to permit the cam element 114 to be adjusted circumferentially of the wheel 112 and thereby provide adjustment of the instant when the abrasive projecting device represented by the wheel 43 becomes operative to direct a blast stream of abrasive into the drum 5 through the opening or slot 6. The lever 118 may be returned to an inoperative position when the cam element 114 passes beyond the cam follower 115 by any suitable means, such as a spring 127 connected at one end to a fixed lug 128. The other end of the spring 127 may be connected to an arm 129 carried by the lever 118. Thus the valve 81 is returned to a position to interrupt the supply of abrasive to the wheel 43 and the cam follower 115 is returned to the periphery of the wheel 112 when the cam element 114 no longer supports the roller 115.

The drum 5 is oscillated through an arc of limited circumferential extent and such reversed rotation of the drum may be effected by reversing the motor 28. Any conventional electrical control circuit (not shown) may be provided for reversing the motor 28. The shaft 82 may be provided with a further cam device for controlling the points of reversing the motor 28. Thus a wheel 130 may be mounted on the shaft 82 so as to rotate therewith. This wheel is shown in detail in Figs. 10 and 11 and is provided with two cam elements 131 for actuating a conventional type of limit switch employed in the customary control circuit for reversing the direction of the driving motor 28. The cams 131 are mounted on the periphery of the cam wheel 130 and may be adjusted circumferentially thereof to control the points of reversal of the drum 5. The cam wheel 130 may be provided with a plurality of holes 132 so as to adjust the position of the cams 131 thereon and thereby control the point of reversal of the drum.

In the operation of the tumbling mill the drum 5 is first rotated to a loading station as represented in Fig. 16. In the loading station the drum 5 is positioned beyond the normal oscillating limits and the opening 6 in the periphery of the drum is so located as to permit the door 13 to swing inwardly through the opening or slot 6. The door 13 may be operated by the handle 25 so as to swing on the hinge mounting 14. The door 13 then projects into the drum as shown in Fig. 16. Thus a plurality of articles to be blasted or a group of castings to be blast cleaned may be introduced through the door opening 15 to load the drum 5. These articles 140 then assume a pocketed position approximating that diagrammatically represented in Fig. 16 and are supported by the drum 5 at one side of the projection 50. The door 13 is then moved to a closed position.

The abrasive throwing wheels 38 and 43 are rotated by starting the motors 42 and 45. The manually controlled valves 77 and 78 are opened by manipulating the handles 79. The abrasive in the bin 70 is thus admitted to the pipes 72 and 73 but the abrasive is not supplied to the wheels 38 and 43, since the cam elements 94 and 114 are not in positions to open the automatic control valves 80 and 81. Thus the wheels 38 and 43 while rotating are then inoperative to project abrasive. The motor 66 is started whereby the elevator 61 is driven and is thus operable for returning abrasive to the main bin 70.

The drum 5 is rotated in a counterclockwise direction from the position shown in Fig. 16 and the drum then enters a cycle of normal oscillation wherein blasting and tumbling of the articles is carried out. As the drum 5 is rotated in a counterclockwise direction by the driving motor 28 the articles 140 are positively moved with the drum, since the projection 50 extends radially inwardly to a point for pushing all of the articles forwardly with the drum. Thus the articles assume a position approximating that depicted in Fig. 17 whereby the articles are elevated from the load position and assume an angle of repose substantially like that shown for the average type of small castings.

As the drum 5 is rotated in a counterclockwise direction, the cam wheels 92 and 112 also move in a counterclockwise direction, since the drive represented by the chain 86 moves the shaft 82 synchronously with the drum 5, and in the direction of the arrows shown in Fig. 18. The cam assembly 90 includes a deflecting member 95 as shown in Fig. 18. This deflecting member is secured to the periphery of the wheel 92 and is provided with two inclined edges 99 and 100. Thus when the drum 5 moves in a counterclockwise direction the inclined surface 99 will engage the roller 96 so as to be properly aligned with the cam element 94. This deflection of the roller 96 is made possible by the swingable mounting of the arm 97 on the spindle 106. The cam element 94 may be of such length and so located on the wheel 92 by adjustment of the cam mounting in the holes 93 as to engage the cam follower or roller 96 when the drum 5 arrives at the position shown in Fig. 17. The roller 96 is then moved outward from the periphery of the wheel 92 and swings the lever 98 so as to open the valve 80 and admit abrasive to the throwing wheel 38 and a blast stream 150 is thus established. The opening 6 is then in position to permit the blast stream 150 to enter the drum. It will be further observed that the blast stream 150 is established before the articles 140 start to fall or cascade in the drum. In this sequence of operation the wheel 43 while rotating is inoperative to project abrasive into the drum, since the roller 115 is then supported on the peripheral surface of the wheel 112 and the abrasive control valve 81 is closed.

As the drum 5 continues to move in a counterclockwise direction, an operating condition approximating that depicted in Fig. 19 will be established wherein the articles fall or cascade in a separated condition over the projection 50 to the opposite side thereof and pass through the blast stream 150. Thus the individual articles falling in a separated relation are individually exposed to the impingement of the abrasive particles thereon. In this connection it is to be noted that the articles have been moved from the original loaded position to such position that each article in falling to the opposite side of the projection 50 turns through approximately three hundred and sixty degrees with respect to the position shown in Fig. 16.

The position of the two cam elements in relation to the cam followers at this stage in the operating cycle is represented in Fig. 20, and it will be noted that the cam wheel 112 is moving in such a direction that the cam follower 115 remains supported on the periphery of the wheel 112 so that the valve 81 remains closed and the wheel 43 is thus inoperative to project the abrasive into the drum. The blast stream 150 is maintained as shown in Fig. 19 since the roller 96 is still riding on an operative portion of the cam element 94 as shown in Fig. 20.

It will be observed from a consideration of Figs. 12 and 20 that the cam element 94 is provided with a guide rib 160 which is arranged in a substantially radial plane and approximately straight throughout a portion of the length of the cam element. The rib 160 then extends obliquely for a short distance over the periphery of the raised portion of the cam element as indicated at 161. Thus when the oblique portion 161 of the rib engages the roller 96 immediately following the position shown in Fig. 20 the roller 96 is deflected and the arm 97 swings about the axis of the spindle 106. The cam element 94 in moving from the position shown in Fig. 20 to the position shown in Fig. 22 causes the roller 96 to be deflected from its original course on the operative surface of the cam element 94. The abrasive valve 80 thereby remains in an open position whereby the wheel 38 continues to project abrasive particles into the drum 5 through the opening 6. Thus the blast stream 150 is maintained as shown in Fig. 21.

As the drum moves into the position shown in Fig. 21 substantially all of the articles have cascaded over the projection 50 to the opposite side thereof. In the illustrated operating cycle the drum is reversed when it arrives at the position shown in Fig. 21 and the blast stream 150 is maintained during reversed rotation. Thus when the drum 5 assumes the position shown in Fig. 21, the counterclockwise movement of the drum is stopped. This operating condition is obtained by adjusting the position of one of the cams 131 on the wheel 130 as permitted by the openings 132 so as to reverse the rotation of the motor 28.

The wheel 43 while continuously rotating during the counterclockwise movement of the drum has nevertheless been inoperative to project abrasive, since the cam element 114 has been moving away from the roller 115 as will be apparent from a consideration of Figs. 18 and 20. The drum 5 in moving in the counterclockwise direction and in approaching the position shown in Fig. 21, and the wheel 112 moving synchronously therewith moves the deflector member 120 of the cam assembly 91 into engagement with the roller 115 and swings this cam follower and the arm 116 laterally to a position in alignment with the cam element 114. This position of the roller 115 is shown in Fig. 22.

The reversed movement of the motor 28 starts the drum 5 rotating in a clockwise direction from the position shown in Fig. 21. The wheel 38 in this exemplary operative cycle continues to project abrasive into the drum and thereby maintain the blast stream 150 until the cam element 94 passes to the position shown in Fig. 24 where the roller 96 returns to the periphery of the wheel 92 by the force of the spring 109 and thus the abrasive valve 80 is closed.

When the drum 5 starts to move in a clockwise direction, the roller 115 is in a position to be engaged by the cam element 114 as shown in Fig. 24 so that the valve 81 will be opened when the drum 5 reaches the position illustrated in Fig. 25, or when the roller 115 rides on the operative part of the cam element 114 as shown in Fig. 26. The roller 115 is then elevated from the periphery of the wheel 112 and the wheel 43 projects a blast stream 151 into the drum. The cam wheel 96 is then on the periphery of the wheel 92 whereby the valve 80 is closed and the wheel 38 while continuing to rotate is inoperative to project abrasive into the drum.

It will be noted that the articles 140 are substantially all positioned to the left of the projection 50 as the drum 5 begins to rotate in the clockwise direction, as shown in Fig. 23. Thus these articles are again elevated since the projection 50 positively moves all of the articles with the drum. The articles thus assume a position somewhat as shown in Fig. 25 as the drum rotates in a clockwise direction. When this position of the drum is attained and in the illustrative cycle of operation, the wheel 43 becomes operative to provide the blast stream 151 and this blast stream is established prior to the cascading or tumbling of the articles over the projection 50.

As the drum moves into the position shown in Fig. 27 the articles fall or cascade in a separated condition through the blast stream 151 and over the projection 50 to the first or load side thereof. The articles have thus been elevated during clockwise rotation of the drum so that these articles turn through approximately three hundred and sixty degrees during the lifting and cascading operation. The articles falling over the projection 50 and through the blast stream 151 are then supported by the drum at the opposite side of the projection, and substantially all of the articles have cascaded over the projection 50 when the drum is moved to the position shown in Fig. 29. The articles thus fall through the blast stream 151 in an individually spaced relationship whereby the maximum surface area of each article is exposed to the blast stream to provide efficient impingement of the abrasive on the individual articles.

The blast stream 151 is maintained as the drum rotates in the clockwise direction during the operating sequence illustrated in Figs. 25, 27, and 29. During this clockwise rotation the cam element 114 maintains the roller 115 away from the periphery of the wheel 112. The cam element 114 being like the cam element 94 is provided with a rib 160 including an oblique portion 161 for swinging the roller 115 and the arm 116 on the spindle 117 as the cam element 114 moves from the position shown in Fig. 28 to the position shown in Fig. 30. The roller 115 thus remains on the operative surface of the cam element 114. The cam roller 96 in the meantime has engaged the inclined surface 100 of the deflector member 95, as shown in Fig. 28, and is thereby swung to a position on the peripheral surface of the wheel 92 so as to be in alignment with the cam element 94 as will be evident upon consideration of Fig. 30.

In this illustrative operating cycle, the clockwise rotation of the drum is reversed when the drum arrives at the position shown in Fig. 29, and the blast stream 151 is maintained during counterclockwise rotation from the position shown in Fig. 29. Thus when the drum arrives in the position shown in Fig. 29, the drum stops. This operating condition is attained by adjusting the position of one of the cams 131 on the wheel 130, as permitted by the openings 132, so as to reverse rotation of the motor 28. The drum 5 then starts to rotate in a counterclockwise direction. The blast stream 151 is maintained during this counterclockwise movement of the drum, since the roller 115 is still supported by an operative portion of the cam element 114. In the meantime the wheel 92 is moving the cam element 94 towards the roller 96, since the cam wheels 92 and 112 are then also moving in a counterclockwise direction. The wheel 43 in this exemplary operating cycle continues to project abrasive into the drum through the opening or slot 6 and thereby maintain the blast stream 151 until the lateral operative portion of the cam element 114 passes to the position shown in Fig. 32. At this point the roller 115 returns to the periphery of the wheel 112 by the force of the spring 127, and thus the abrasive valve 81 is closed to render the wheel 43 inoperative even though the wheel continues to rotate during further counterclockwise rotation of the drum.

The drum 5 then moves into the position shown in Fig. 17 and when the lip 3 clears the opening 36 the blast stream 150 is re-established. The cycle of operation thus proceeds through that described in connection with the counterclockwise rotation of the drum, as illustrated in Figs. 17 to 21, after which the drum again starts rotating in a clockwise direction through the operating sequence illustrated in Figs. 21 to 30.

A cycle of operation has been described in connection with Figs. 17 to 32 wherein the cam assemblies described in association therewith and in connection with the oscillation of the drum provides an interval during normal oscillation when neither of the abrasive projecting devices as represented by the throwing wheels 38 and 43 is operative to direct a blast stream into the drum. This operating cycle, including the intermittent firing of the abrasive projecting devices, has been found to materially reduce the time required to treat a group of articles, such as to blast clean a load of castings, in a materially shorter period than that required to blast clean a comparable group of castings with a conventional type tumbling mill, wherein the articles are continuously subjected to the action of a blast stream operating continuously during the cleaning period. The operating cycle hereinabove described has also been found to materially reduce the quantity of abrasive required to properly blast clean the castings in comparison to the quantity of abrasive required to properly blast clean a similar group of castings in a conventional type tumbling mill wherein the articles are subjected to a continuous blast stream. Thus it will be apparent that a material saving is accomplished in the power required to project the abrasive into the drum and the power required to return the spent abrasive particles by the elevator 61 into the bin 70 for re-use. These advantages appear to result from the feature of dispersing the articles as they move through the blast streams whereby a greater surface area of each individual article is exposed for impingement of the abrasive moving at blasting velocities.

The mode of pocketing and cascading the charge of articles herein disclosed also effects economy of power and of use of abrasive and increases the uniformity of blasting. As is shown in Figs. 21 and 29 (and see Figs. 23 and 31), which illustrate the preferred limits of normal oscillation of drum 5, the hollow V-shaped lug 50 has substantially flat side walls diverged from each other at an obtuse angle. This construction not only facilitates disposal of the spent abrasive, it also provides a well braced structure separating the drum into two compartments, and more importantly enables all the articles of the charge to be sequentially cascaded from one of the compartments to the other during the limited angular rotation of the drum. This latter function is provided since the side wall of the projection 50 which is pushing articles ahead of it, and causing them to fall in a substantially flat sheet-like cascade when their angle of repose is progressively exceeded, itself attains an angle equal to the angle of repose when the drum is rotated through only acute angular semi-oscillations, as shown in Figs. 21, 23, 29 and 31. If the wall 50 were substantially radial a much greater lifting and tilting of the pocketed articles would be necessary to deliver the last of them from one compartment to another, requiring obtuse angular semi-oscillations of the drum. Accordingly the power required to rotate the drum and raise, tilt and cascade the articles, is materially reduced by this improved cascading arrangement.

Another advantage of this arrangement realized in the exemplary embodiment resides in the fact that since the articles are all spilled across the partition 50 by the augmented inclination of its inclined walls resulting from a relatively limited rotation of the drum (through semi-oscillations of only about 60° in the exemplary embodiment) the articles are all spilled while the apex of the member 50 remains in the lower quadrants of the drum rotation and thus at a substantially uniform distance from the stationary blasting wheel 38 or 43 of this embodiment. If the wall 50 were substantially radial on the other hand, the drum would have to oscillate from its mid-position by approximately 90° more than the angle of repose to discharge the last of the pocketed articles and in so doing the radial partition would have to be rotated to an elevation substantially above the axis of the drum and thus substantially nearer the origin of the stationary blast stream, sacrificing the uniformity of blasting attained by the embodiment herein disclosed.

Moreover, with a substantially radial partition 50 the necessity for increased rotation of the drum would be so great that the peripheral opening of the drum in the exemplary embodiment could not be limited to the extent disclosed, the capacity and efficiency of the drum would be reduced, and the simple mode of blasting employed in the exemplary embodiment herein could not be practiced.

In addition this improved cascading arrangement accelerates the blasting operation by reducing the time period of semi-oscillations and also economizes in the use of abradant by reducing the time interval for which abradant must be fed to the blasting wheels during each semi-oscillation.

The operating sequence shown and described in connection with Figs. 17 to 32 is merely illustrative of one set of operating conditions for the purpose of describing the invention in a manner so that the functioning of the apparatus may be clearly understood. It is apparent that other operating conditions can be obtained by adjusting the length of the cam elements 94 and 114, and by adjusting the position of these cam elements on the periphery of the wheels 92 and 112 respectively. One of these modified operating cycles includes the interruption of the blast stream 150 as the lip 4 of the drum moves to a position adjacent the path of the blast stream 150 as the drum moves in a counterclockwise direction into the position shown in Fig. 21. This interruption of the blast stream 150 may be accomplished by permitting the roller 96 to drop from the right end 110 of the cam element 94 in the position shown in Fig. 22. Thus during reversed movement of the drum and movement thereof in a clockwise direction, the roller 96 will be deflected on the peripheral surface of the wheel 92 by the inclined end 110 of the cam element 94 and return on the periphery of the wheel 92 to the other end of the cam element 94. Thus the wheel 38 while continuing to rotate is inoperative during clockwise rotation of the drum from the position shown in Fig. 21.

The blast stream 151 may likewise be interrupted when the lip 3 approaches the path of the blast stream 151 as the drum moves in a clockwise direction into the position shown in Fig. 29. The blast stream 151 may be interrupted by so shaping the cam element 114 that the roller 115 passes the end of the cam element 114 and returns to the periphery of the wheel 112 before the lip portion 3 or the periphery of the drum adjacent the opening 6 moves into the path of the blast stream 151. The inclined end 113 of the cam element 114 then deflects the roller 115 on the periphery of the wheel 112 during counterclockwise rotation of the drum from the position shown in Fig. 29 whereby the wheel 43 is inoperative to project abrasive into the drum even though this wheel continues to rotate.

A further variation in the operating cycle may be accomplished by substituting the cam element shown in Fig. 13 for the cam elements 94 and 114. The cam elements 94 and 114 are similar and different reference numerals have been employed in connection with these two cams for the purpose of simplifying the description of the apparatus. Thus the cam element shown in Fig. 13 is provided with an adjustable part 174. This adjustable part 174 of the cam element provides an elevated portion at the same height as the operative surface of the cam. The adjustable part 174 is provided with tongues 176 adapted to extend into grooves 177 of the cam element. Thus the adjustable part may be moved so as to extend the operative surface of the cam. The adjustable part may therefore be extended so as to be substantially aligned with the end of the cam element proper so that the blast stream 150 would be maintained until the lip 3 of the drum moves to a position adjacent the path of the blast stream 150 when the drum rotates in a clockwise direction from the position shown in Fig. 21. Likewise the blast stream 151 would be maintained until the lip 4 of the drum is moved to a position adjacent the path of the blast stream 151 as the drum rotates in a counterclockwise direction from the position shown in Fig. 29.

When the treatment of the articles within the drum has been completed the drum is rotated beyond the normal oscillating arc to an unloading station. This movement of the drum 5 is preferably accomplished by rotating the drum in a counterclockwise direction. The drum in rotating in a counterclockwise direction causes the lip 4 to approach the path of the blast stream 150. As the periphery of the drum moves to a position adjacent the path of the blast stream as represented in Fig. 21, the roller 96 is then in a position to drop from the operative surface of the cam element 94 onto the periphery of the wheel 92. The lever 98 is thus shifted to close the abrasive control valve 80 and interrupt the blast stream 150. The drum then moves beyond the normal oscillating limit and as the drum moves in a counterclockwise direction beyond the position shown in Fig. 21 both of the abrasive projecting devices are inoperative since the cam elements 94 and 114 are thus remotely positioned from the respective cam followers or rollers 96 and 115. The drum 5 then moves into the unloading position, as shown in Fig. 33 and the castings drop through the opening or slot 6 into the lower portion of the housing 10.

The doors 16 and 17 are opened prior to rotating the drum to the unloading station and a tote box or other conveyance is positioned within the housing to receive the articles dumped from the drum. The apparatus may include a shield or partition 135 for preventing the articles from engaging the drive mechanism represented by the motor 28 and the speed reducing device 31 as these articles drop downwardly from the drum 5. The drum may be continuously rotated during the unloading operation since the articles readily drop from the drum through the opening or slot 6 and the unloading of the drum is thus accomplished in a short interval, and no problem is encountered in exhausting all of the articles through the slot or opening 6.

The drum may be rotated in a counterclockwise direction through the unloading station until the drum arrives at the load position represented in Fig. 16. Then the door 13 may be opened by swinging this door inwardly through the opening 6 into the drum whereby the drum may be reloaded. It will be noted that the new load of articles to be treated in the tumbling mill may be arranged adjacent the door 13 before the unloading operation is initiated. The removal of the treated articles from the tumbling mill need not therefore be accomplished before a new load is in position to be introduced into the drum. Thus the period during which the tumbling mill is inactive in unloading and loading the apparatus is reduced to a minimum. It will be further observed that the articles are loaded at one side of the apparatus and unloaded at the opposite side of the tumbling mill to thereby facilitate the movement of the articles in one general direction in a manufacturing process.

In unloading the drum a somewhat different operating sequence may be followed so as to cause all of the spent abrasive particles within the drum to move therefrom prior to the dumping of the articles from the drum. Thus both abrasive projecting wheels 38 and 43 may be rendered inoperative by manipulating the handles 79 to close the valves 77 and 78 when the blasting operation is completed. Thereafter the drum 5 may be moved through a small number of normal oscillating cycles whereby the spent abrasive particles pass through the openings 51 and the apertures 53 into the trough 54. During such oscillation of the drum and when no further abrasive is being projected thereinto, the spent abrasive may be cleared from the drum and deposited in the hopper 58. After the abrasive has been thus removed the drum may be moved beyond the normal oscillating limit and preferably in a clockwise direction to and through the unloading position as represented in Fig. 33.

While the invention has been described with reference to specific structural details and with regard to abrasive projecting wheels as the abrasive projecting devices, it is to be understood that various modifications may be made in the apparatus and any other well known type of abrasive projecting devices may be employed without departing from the spirit and scope of the invention. It is to be further understood that the operating sequence wherein the point at which the one abrasive projecting device is rendered operative and the point at which this same projecting device is rendered inoperative with respect to the position of the drum may be varied without departing from the scope of the invention. It is to be further appreciated that modifications may be made in the mechanism for controlling the operative and inoperative conditions of the abrasive projecting devices without altering the scope of the invention, and all of such modifications are to be considered as being within the scope of the invention as defined in the appended claims.

I claim:

1. In a tumbling mill, a drum having an opening in the periphery thereof of limited circumferential extent, means oscillating said drum about its axis through a limited arc with said opening remaining in a generally upper position during normal oscillation thereof, a projecting device for directing a blast stream into said drum through said opening, means rendering said projecting device inoperative before the drum periphery adjacent said opening moves into the path of the blast stream, a second projecting device for directing another blast stream into said drum through said opening, and means rendering the second projecting device inoperative before the drum periphery adjacent said opening moves into the path of the second blast stream.

2. In a tumbling mill, a rigid drum having an opening in the periphery thereof of limited circumferential extent, means supporting said drum for rotation about its axis and in a substantially horizontal plane, means oscillating said drum about said axis through a limited arc with said opening remaining in a generally upper position during said oscillation, an abrasive projecting device for directing an abrasive blast stream into said drum when said opening is positioned to admit the blast stream into the drum, means interrupting said abrasive blast stream before the drum periphery adjacent said opening moves into the path of said blast stream, another abrasive projecting device for directing another abrasive blast stream into said drum when said opening is positioned to admit the blast stream from the second device into the drum, and means interrupting the second blast stream before the drum periphery adjacent said opening moves into the path of the second blast stream.

3. A tumbling mill comprising, a drum having a slot in the periphery thereof of limited circumferential extent, means oscillating said drum about said axis through a limited arc with said slot remaining in a generally upper position during normal oscillation thereof, an abrasive throwing wheel, means supplying abrasive to said wheel for projecting abrasive particles through said opening into the drum, means interrupting the supply of abrasive to said wheel before the drum periphery adjacent said opening moves into the path of the abrasive projected by the wheel, a second abrasive throwing wheel, means supplying abrasive to said second wheel for projecting abrasive particles through said opening into the drum, means interrupting the supply of abrasive to the second wheel before the drum periphery adjacent said opening moves into the path of the abrasive projected by the second wheel.

4. A tumbling mill comprising, a drum having an elongated slot in the periphery thereof arranged with the major dimension thereof axially of the drum, means oscillating said drum about its axis through a limited arc with said slot remaining in a generally upper position during oscillation thereof, an abrasive throwing wheel for providing a blast stream of substantially rectangular pattern directed downwardly towards the drum in a plane approximately parallel to the axis of the drum, a second abrasive throwing wheel circumferentially spaced from the first wheel for projecting a blast stream of substantially rectangular pattern downwardly towards said drum in a plane approximately parallel to the axis of said drum, means rotating said wheels, means supplying abrasive to the first wheel when the slot in the drum is positioned for abrasive to be projected into the drum, means interrupting the supply of abrasive to the first wheel before the drum periphery adjacent said opening moves into the path of the abrasive projected by the first wheel, means supplying abrasive to the second wheel when the slot in said drum is positioned to permit abrasive projected by the second wheel to pass into the drum, and means interrupting the supply of abrasive to the second wheel before the drum periphery adjacent said slot moves into the path of the abrasive projected by the second wheel.

5. In a tumbling mill, a generally cylindrical drum for receiving a plurality of articles to be blasted, means supporting said drum for rotation about the axis thereof, means projecting a stream of abrasive particles downwardly in the drum at a blasting velocity, a projection carried by the drum arranged throughout the length thereof and extending radially inward from the cylindrical wall a distance approximately equal to one-half the radius of the drum for positively moving all of the articles circumferentially upon rotation of the drum whereby the articles cascade over said projection through said blast stream.

6. In a tumbling mill, a generally cylindrical drum for receiving a plurality of articles to be blasted, means supporting said drum for rotation about the axis thereof, means projecting a blast stream of abrasive particles into the drum and in a generally downward direction therein, and an inverted V-shaped projection carried by the drum arranged throughout the length thereof and extending inward from the cylindrical wall for a distance approximately equal to one-half the radius of the drum so that the articles are positively moved circumferentially upon rotation of the drum whereby the articles cascade over said projection through the blast stream.

7. In a tumbling mill, a generally cylindrical drum for receiving a plurality of articles to be blasted, means projecting a stream of abrasive particles in to the drum at a blasting velocity, a projection carried by the drum arranged throughout the length thereof and extending radially inward from the cylindrical wall a distance sufficient for positively moving all of the articles at one side of the projection circumferentially upon rotation of the drum to a position where they cascade over said projection through said blast stream, means interrupting said blast stream after the articles have fallen to the opposite side of said projection, means operable thereafter for projecting a second stream of abrasive particles into said drum, means for reversing the drum whereby all the articles are positively moved circumferentially in a direction opposite to the first circumferential movement of the articles and to a position where the articles cascade over said projection in an opposite direction through the second blast stream, and means interrupting the last mentioned blast stream after the articles have all fallen over said projection.

8. In a tumbling mill, a cylindrical shaped drum having an opening in the periphery thereof of limited circumferential extent, means supporting said drum for rotation about the axis thereof, a projection carried by the drum extending radially inward from the periphery arranged throughout the length of the drum and substantially diametrically opposite said opening, said drum being rotatable to a loading station with said opening positioned generally laterally of the axis of the drum whereby articles may be introduced through said opening and supported by the drum at one side of said projection, said drum being rotatable in an opposite direction whereby all of the articles are positively moved circumferentially by the projection and thereafter tumble over the projection to the other side thereof, means directing a blast stream of abrasive into the drum prior to the tumbling of the articles over said projection to provide a blast zone through which the articles pass when tumbling over said projection, means interrupting said blast stream after all of the articles have fallen and are supported at the other side of said projection, said drum being rotatable in an opposite direction whereby all of the articles are positively moved in a circumferentially opposite direction by said projection to a position where the articles tumble over the projection in an opposite direction, means directing a blast stream of abrasive into the drum prior to the last mentioned tumbling of the articles to provide a second blast zone through which all of the articles pass when tumbling in a reverse direction over said projection, and means for interrupting the last mentioned blast stream after all of the articles have moved over said projection.

9. In a tumbling mill, a drum, means supporting said drum for rotation with the axis thereof in a substantially horizontal plane, means oscillating said drum about said axis through a limited arc, means projecting abrasive particles into the drum for blasting articles therein, said drum having apertures extending through the peripheral wall, a trough carried by the drum including walls defining the circumferential ends of the trough for receiving the abrasive particles escaping from the drum through said apertures, and said end walls extending obliquely over the periphery of the drum and diverging away from each other in proceeding from one end of the drum towards the other whereby the abrasive in the trough is moved axially towards an end of the drum during oscillation thereof.

10. In a tumbling mill, a drum having a slot in the periphery thereof of limited circumferential extent, means supporting said drum for rotation with the axis thereof in a substantially horizontal plane, means oscillating said drum about said axis through a limited arc with said slot remaining in a generally upper position whereby articles in the drum are retained therein during normal oscillation thereof, a hollow projection extending inwardly from the peripheral wall of said drum, means for projecting abrasive particles through said slot into the drum to blast said articles, the wall of said drum covered by said projection having apertures therein, said projection having openings therein whereby the abrasive may escape from the drum through said openings and said apertures, a trough including circumferential end walls carried by the drum arranged radially outward of said apertures, and the end walls of said trough extending obliquely over the periphery of the drum and diverging from each other in proceeding from one end of the drum towards the other whereby the abrasive particles in the trough are moved towards an end of the drum during oscillation of the drum.

11. In a tumbling mill, a rigid drum having an axially extending slot in the periphery thereof of limited circumferential extent, means supporting said drum for rotation with the axis thereof in a substantially horizontal plane, means oscillating the drum about its axis through a limited arc with said slot remaining in a generally upper position for retaining articles to be blasted within the drum during normal oscillation thereof, means projecting abrasive particles into the drum through said slot, an inverted V-shaped projection extending inwardly from the peripheral wall of the drum and arranged with the inverted apex substantially diametrically opposite said slot, said projection having openings therein, said drum having apertures therein at that portion covered by said projection, a generally radially arranged partition within said projection, a trough carried by the drum including end walls defining the circumferential extent of the trough arranged radially outward of said apertures, and said end walls diverging away from each other in proceeding from one end of the drum towards the other.

12. In a tumbling mill, a drum having an opening in the periphery thereof of limited circumferential extent, means for oscillating said drum about its axis through a limited arc with said opening remaining in a generally upper position, a housing including an arcuate portion extending over the drum substantially concentric to the path described by that portion of the drum adjacent said opening, means projecting a blast stream of abrasive particles onto articles within the drum, and gasket means movable with the drum embracing said opening engaging the arcuate portion of said housing during normal oscillation of the drum.

13. In a tumbling mill, a substantially cylindrical shaped drum having an opening in the periphery thereof of limited circumferential extent, means supporting said drum for oscillation about the axis thereof, a housing including a curved portion substantially concentric with the axis of said drum and extending over the periphery of the drum through an arc greater than the normal oscillating movement of the drum, means for projecting abrasive particles onto articles within the drum, and gasket means carried by the drum arranged around the perimeter of said opening engaging the curved portion of said housing during normal oscillation of the drum.

14. A tumbling mill comprising, a drum having a slot in the periphery thereof, means for oscillating said drum about its axis through a limited arc with said slot remaining in a generally upper position to retain articles to be blasted within the drum during normal oscillation thereof, an abrasive throwing wheel, means supporting said abrasive throwing wheel for rotation to direct a blast stream downwardly through said slot into the drum, a second abrasive throwing wheel mounted at a circumferentially spaced position from the first wheel for projecting an abrasive blast stream downwardly through said slot into said drum, means for rotating said wheels, a supply of abrasive particles, means guiding the abrasive from said supply to each wheel, a valve for interrupting the movement of abrasive in each guide means, and means controlled by the oscillation of said drum for actuating said valves to supply abrasive to each wheel.

15. A tumbling mill comprising, a drum having a slot in the periphery thereof, means supporting said drum for oscillation about its axis through a limited arc with said slot remaining in a generally upper position during normal oscillation thereof, an abrasive throwing wheel mounted to direct an abrasive blast stream downwardly through said slot into the drum, a supply of abrasive particles, means guiding abrasive from said supply to said wheel, a valve for controlling the movement of abrasive in said guide means, a cam assembly driven synchronously with the oscillation of said drum, a cam follower mounted to be actuated by said cam assembly, and a lever actuated by said cam follower for controlling the position of said valve in dependence upon the position of the cam assembly with respect to the cam follower.

16. A cam assembly for controlling the establishment and the interruption of a blast stream in a tumbling mill comprising, a wheel having a cylindrical peripheral surface, a cam follower yieldably engaging said peripheral surface, a cam element on the wheel providing a surface radially outward from the periphery of the wheel and adapted to engage said cam follower, and a rib on the cam element including an oblique portion for deflecting the cam follower on the surface of the cam element.

17. A cam assembly for controlling the establishment and the interruption of a blast stream in a tumbling mill comprising, a wheel having a cylindrical peripheral surface, a roller yieldably engaging said peripheral surface, a cam element on the wheel providing a surface radially outward from the periphery of the wheel and adapted to engage said roller, a rib on the cam element including an oblique portion for deflecting the roller on the surface of the cam element, and a deflecting member on the periphery of said wheel adapted to engage the roller and deflect it laterally on said peripheral surface.

18. The method of blasting articles which comprises, establishing a blast stream of abrasive particles, lifting a plurality of articles to a position for falling downwardly in a separated condition through the blast stream, interrupting said blasting stream, establishing a second blast stream, lifting the articles to a position for falling downwardly in a separated condition through the second blast stream, and interrupting the second blast stream.

19. In a tumbling mill, a generally cylindrical shaped drum, means supporting said drum for rotation about a substantially horizontal axis, means projecting an abrasive stream in a downward direction in the drum, a projection including side walls extending inwardly from the periphery of the drum and converging in a lip so spaced from the inner surface of the drum as to push substantially all the articles of a normal load circumferentially with the drum whereby the articles are lifted principally by a side wall of the projection which tilts during further rotation of the drum to spill the articles over said lip and through said blast stream.

20. In a tumbling mill, a drum having an opening in the periphery thereof of limited circumferential extent, means for supporting said drum for oscillation about its axis through a limited arc with said opening remaining in a generally upper position during normal oscillation thereof, a projecting device operable to direct a blast stream into said drum when said opening is in a position to admit the blast stream into the drum, and means rendering said projecting device inoperative before the drum periphery adjacent said opening moves into the path of the blast stream.

21. A tumbling mill comprising, a drum, means supporting said drum for rotation with the axis of the drum in a substantially horizontal position, a lug carried by the drum projecting inwardly from the peripheral wall to push articles with the drum during rotation thereof, said lug in cooperation with a peripheral portion of the drum forming supporting means lifting the articles during rotation of the drum, means projecting an abrasive blast stream downwardly onto the surface of the articles as they are moved to an elevated position where the articles progressively fall freely through the blast stream upon further rotation of the drum, and means operative in timed relation with the movement of the drum for interrupting the blast stream after the articles have fallen therethrough.

22. A tumbling mill comprising, a drum having an opening in the periphery thereof of limited circumferential extent, means for oscillating said drum about its axis with said opening remaining in a generally upper position during said oscillation, an abrasive throwing wheel for projecting abrasive particles through said opening in the drum, a second abrasive throwing wheel for projecting abrasive particles through said opening into the drum, means for supplying abrasive to each wheel, and means interrupting the supply of abrasive to one wheel during the period when the other wheel is receiving abrasive from said supply.

23. A tumbling mill comprising, a drum having a slot in the periphery thereof, means for oscillating said drum about its axis through a limited arc with said slot remaining in a generally upper position to retain articles to be blasted within the drum during normal oscillation thereof, an abrasive throwing wheel, means supporting said abrasive throwing wheel for rotation to direct a blast stream downwardly through said slot into the drum, a second abrasive throwing wheel mounted at a circumferentially spaced point from the first wheel for projecting an abrasive blast stream downwardly through said slot into said drum, means for rotating said wheels, a supply of abrasive particles, and means controlled by the oscillation of the drum alternately admitting abrasive from the supply to the wheels.

24. In a tumbling mill, a generally cylindrical shaped drum, means supporting said drum for rotation, a centrifugal blasting wheel having propeller blades, means rotating said wheel to move the propeller blades in an orbital path, means supplying abrasive to said propeller blades whereby the abrasive moves outwardly on the blades and passes into said drum, means for interrupting the supply of abrasive to said propeller blades while the wheel continues to rotate, a second centrifugal blasting wheel having propeller blades, means rotating the second wheel to move the propeller blades thereof in an orbital path, means supplying abrasive to the propeller blades of the second wheel whereby abrasive moves outwardly on the propeller blades of the second wheel and passes into the drum, and means for interrupting the supply of abrasive to the propeller blades of the second wheel while the same continues to rotate.

25. In a tumbling mill, a drum having an opening in the periphery thereof, means supporting said drum for rotation, a centrifugal blasting wheel mounted for rotation adjacent the periphery of the drum and having propeller blades, means rotating said wheel to move the propeller blades in an orbital path, means supplying abrasive to said propeller blades when said opening registers with the wheel whereby the abrasive moves outwardly on the propeller blades and passes into the drum through said opening, means for interrupting the supply of abrasive to said propeller blades, a second centrifugal basting wheel mounted for rotation adjacent the periphery of the drum and having propeller blades, means rotating the second wheel to move the propeller blades thereof in an orbital path, means supplying abrasive to the propeller blades of the second wheel when said opening registers with the second wheel whereby the abrasive moves outwardly on the propeller blades thereof and passes into the drum through said opening, and means for interrupting the supply of abrasive to the propeller blades of the second wheel.

26. A method of blasting a multiplicity of articles in a single charge which consists in pocketing the entire charge of articles, moving the pocketed charge of articles from their lowermost position laterally and upwardly in an arcuate path of less than 90° arcuate extent, and simultaneously progressively tilting the charge to progressively spill all the articles of the entire charge sequentially from their pocketed position during their so limited arcuate movement, and establishing a blast stream of abrasive particles directed to impinge upon said articles as they sequentially fall from their pocketed position.

27. A method according to claim 26 in which said blast stream is directed to impinge upon said articles from a position substantially diametrically opposite the arcuate path in which the articles are moved and spilled and distant from said path by approximately twice the radius of its arc.

28. A method of blasting a multiplicity of articles in a single charge which consists in pocketing the entire charge of articles, moving the pocketed charge of articles upwardly and laterally along one lower quadrant of an arcuate path by an amount of less than 90° arcuate extent from their lowermost position, and simultaneously progressively tilting the charge to progressively and sequentially spill from their pocketed position all the articles of the charge during their so limited arcuate movement and thus return them sequentially to their lowermost position, thereafter repeating substantially the same moving and spilling operation on the charge in the next adjacent lower quadrant of said arcuate path, and establishing a blast stream of abrasive particles directed to impinge upon the articles of the charge during each of the said spilling operations.

29. A method according to claim 28 in which the blast stream is directed to impinge upon said articles from positions substantially diametrically opposite the arcuate paths in which the articles are moved and spilled and distant from said paths by approximately twice the radius of their arcs.

30. In a tumbling mill, a generally cylindrical drum for receiving a load of articles to be blasted, means supporting said drum for rotation with the axis thereof in a substantially horizontal position, an inverted V-shaped partition extending inwardly from the peripheral wall of the drum and from end to end thereof, said partition being of substantial height throughout its extent from end to end of the drum and dividing the load receiving space of the drum into two pocket-like compartments either of which may receive the entire load of articles being blasted by transfer across said partition from the other, means for turning said drum on its axis to first lift the load of articles in one compartment as a body, and thereafter tumble them freely and sequentially across said partition to the other compartment, and means for projecting a stream of abrasive particles in a chordal direction across the interior of said drum to impinge upon the articles as they fall sequentially from one compartment to the other.

31. A combination according to claim 30 in which the walls of said V-shaped partition diverge from one another at an obtuse angle, whereby the entire load of articles being blasted is caused to tumble sequentially across said partition by a rotation of said drum which moves the apex of said V-shaped partition through an arc of less than 90° from its lowermost position.

32. A combination according to claim 30 in which the walls of said V-shaped partition diverge from one another at an obtuse angle whereby the entire load of articles being blasted is caused to tumble sequentially across said partition by a rotation of said drum which moves the apex of said V-shaped partition through an arc of less than 90° from its lowermost position, and in which said abrasive projecting means is located in a stationary position and substantially diametrically opposite to the arc of rotation of said apex.

33. A combination according to claim 30 in which said inverted V-shaped partition embraces an abrasive discharge space and has its walls formed to provide passages for abrasive passing from said compartments to said discharge space.

34. A combination according to claim 30 in which said inverted V-shaped partition embraces an abrasive discharge space and has its walls formed to provide passages for abrasive passing from said compartments to said discharge space, and in which said V-shaped partition comprises an imperforate divided wall extending in its abrasive discharge space from one end of the drum to the other, which prevents abrasive entering said space through the passages in one of the V-shaped walls from exiting from said space through the passages in the other.

ARCHIBALD D. EVANS.

REFERENCES CITED

The following references are of record in the file of this patent:

UNITED STATES PATENTS

| Number | Name | Date |
|---|---|---|
| 1,476,619 | Kemp et al. | Dec. 4, 1923 |
| 2,104,055 | Peik | Jan. 4, 1938 |
| 2,116,160 | Rosenberger et al. | May 3, 1938 |
| 2,131,732 | Hammell | Oct. 4, 1938 |

FOREIGN PATENTS

| Number | Country | Date |
|---|---|---|
| 457,897 | Great Britain | Dec. 8, 1936 |
| 506,834 | Great Britain | June 6, 1939 |